(12) United States Patent
An

(10) Patent No.: US 9,335,847 B2
(45) Date of Patent: May 10, 2016

(54) OBJECT DISPLAY METHOD AND APPARATUS OF PORTABLE ELECTRONIC DEVICE

(71) Applicant: Samsung Electronics Co., Ltd., Suwon-si, Gyeonggi-do (KR)

(72) Inventor: Jinwan An, Buk-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 14/221,836

(22) Filed: Mar. 21, 2014

(65) Prior Publication Data

US 2014/0300560 A1 Oct. 9, 2014

(30) Foreign Application Priority Data

Apr. 9, 2013 (KR) .................. 10-2013-0038685

(51) Int. Cl.
  *G06F 3/041* (2006.01)
  *G06F 3/0488* (2013.01)
(52) U.S. Cl.
  CPC .............. *G06F 3/041* (2013.01); *G06F 3/0488* (2013.01); *G06F 3/04883* (2013.01); *G06F 3/04886* (2013.01)
(58) Field of Classification Search
  CPC ..... G06F 3/041; G06F 3/0412; G06F 3/0416; G06F 3/044; G06F 3/045; G06F 3/048; G06F 3/0481; G06F 3/04817–3/04855; G06F 3/0487–3/04886
  See application file for complete search history.

(56) References Cited

U.S. PATENT DOCUMENTS

| 2007/0273663 | A1 | 11/2007 | Park et al. |
| 2009/0160792 | A1 | 6/2009 | Morohoshi et al. |
| 2011/0107272 | A1* | 5/2011 | Aguilar .................. 345/173 |
| 2012/0226978 | A1* | 9/2012 | Harberts et al. .......... 715/702 |
| 2013/0120464 | A1* | 5/2013 | Wei et al. ................ 345/672 |

FOREIGN PATENT DOCUMENTS

| DE | 10 2008 038 897 A1 | 2/2010 |
| JP | 2009-169820 A | 7/2009 |
| JP | 2010-244490 A | 10/2010 |
| KR | 10-2010-0003621 A | 1/2010 |
| KR | 10-2011-0018589 A | 2/2011 |
| KR | 10-2011-0090447 A | 8/2011 |
| WO | 2010/018126 A1 | 2/2010 |
| WO | 2013/034896 A2 | 3/2013 |
| WO | 2013/044938 A1 | 4/2013 |

* cited by examiner

*Primary Examiner* — Nathan Danielsen
(74) *Attorney, Agent, or Firm* — Jefferson IP Law, LLP

(57) ABSTRACT

An object display method and apparatus of a portable electronic device for facilitating selection of an object displayed on the screen by rearranging the objects dynamically is provided. The object display method of a portable electronic device includes displaying at least one object, receiving a touch event input from a region, determining rearrangement of the at least one object based on the touch event, grouping the at least one object according to the rearrangement determination, and rearranging the at least one object according to the rearrangement determination.

23 Claims, 25 Drawing Sheets

OBJECT DISPLAY METHOD AND APPARATUS OF PORTABLE ELECTRONIC DEVICE

CROSS-REFERENCE TO RELATED APPLICATION(S)

This application claims the benefit under 35 U.S.C. §119(a) of a Korean patent application filed on Apr. 9, 2013 in the Korean Intellectual Property Office and assigned Serial number 10-2013-0038685, the entire disclosure of which is hereby incorporated by reference.

TECHNICAL FIELD

The present disclosure relates to a function of a portable electronic device. More particularly, the present disclosure relates to an object display method and apparatus of a portable electronic device for facilitating selection of an object displayed on the screen by dynamically rearranging the displayed objects.

BACKGROUND

Recently, with advances in information communication and semiconductor technologies, portable electronic devices have become widespread and are used in nearly every field. In particular, portable electronic devices are outgrowing their traditional fields to reach a mobile convergence phase. In that regard, a portable electronic device is equipped with an interactive screen making it easy to control various functions such as messaging, photographing, and multimedia playback, as well as the convention telephony function.

As the size of the screen increases, the portable electronic device allows the user to arrange more and more objects such as application icons on the screen so as to execute various functions quickly. However, when the user holds the portable electronic device with one hand, it is not easy to select an object displayed on the screen with the thumb of the same hand. For example, if the user attempts to select an object positioned out of the reach of the right thumb on the screen while holding the portable electronic device with the right hand, there is a risk of dropping the portable electronic device, especially when the user has small hands.

Therefore, a need exists for a method for rearranging the objects or changing the positions of the objects to facilitate selecting or executing an object on the screen with a simple action while holding the portable electronic device with one hand.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an object display method and apparatus of a portable electronic device that is capable of facilitating rearrangement of the objects on the screen of the portable electronic device.

In accordance with an aspect of the present disclosure, an object display method of a portable electronic device is provided. The object display method includes displaying at least one object, receiving a touch event input from a region, determining rearrangement of the at least one object based on the touch event, grouping the at least one object according to the rearrangement determination, and rearranging the at least one object according to the rearrangement determination.

In accordance with an aspect of the present disclosure, an object display apparatus of a portable electronic device is provided. The object display apparatus includes a touch screen configured to generate a touch event input from a region and to display at least one object, and a control unit to determine rearrangement of the at least one object based on the touch event, to group the at least one object according to the rearrangement determination, and to rearrange at least one object according to the rearrangement determination.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
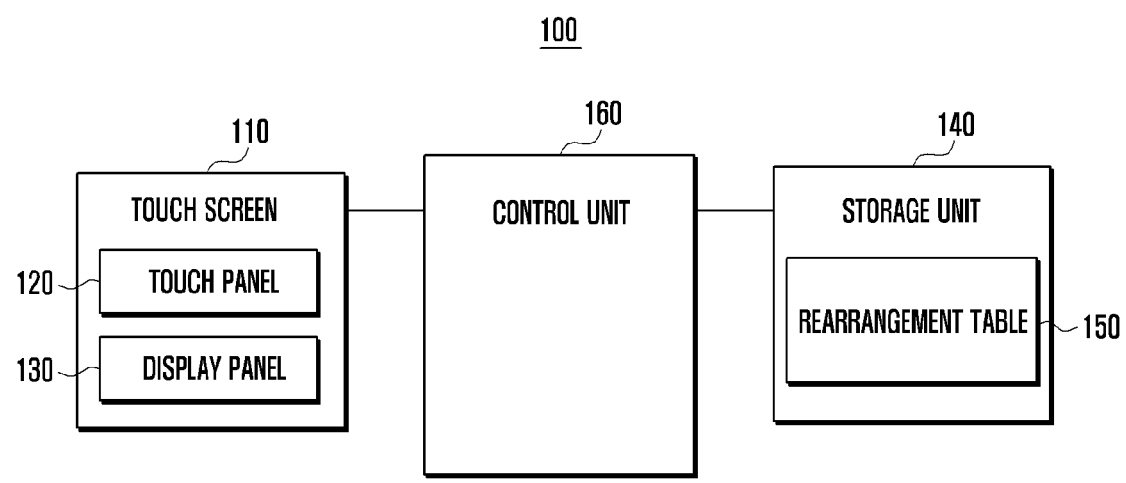
FIG. 1 is a block diagram illustrating a configuration of a portable electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An object display method and a portable electronic device according to an embodiment of the present disclosure are described hereinafter. Here, the portable electronic device may be any electronic device equipped with a touch screen such as a mobile communication terminal, a Personal Digital Assistant (PDA), a smart phone, a tablet PC, a Portable Multimedia Player (PMP), and the like.

In the following description, the term 'object' may include an application icon, an item, file, and an image that are displayed on the screen of the portable electronic device in the form of pictures or symbols for selecting corresponding functions and/or data.

A detailed description of well-known functions and structures incorporated herein may be omitted to avoid obscuring the subject matter of the present disclosure. The terms and words used in this description and the appended claims are not to be interpreted in common or lexical meaning but, based on the principle that an inventor can adequately define the meanings of terms to best describe the disclosure, to be interpreted in the meaning and concept conforming to the technical concept of the present disclosure. Thus, it should be understood that there may be various equivalents and modified examples that can replace the embodiments described in the present specification and the configuration shown in the drawings at the time of filing the present application. In the drawings, certain elements may be exaggerated or omitted or schematically depicted for clarity of the present disclosure.

FIG. 1 is a block diagram illustrating a configuration of a portable electronic device according to an embodiment of the present disclosure.

Referring to FIG. 1, the portable electronic device 100 may include a touch screen 110, a storage unit 140, and a control unit 160.

The touch screen 110 may include a touch panel 120 and a display panel 130. The touch panel 120 may be implemented as an add-on type on the display panel 130 so as to be placed on the display panel 130 or may be implemented as an on-cell or an in-cell type so as to be coupled with the display panel 130.

The touch panel 120 may generate a touch event in response to a contact of a user's finger or an electric pen or the like thereon, and transfer the generated touch event to the control unit 160. For example, the touch panel 120 may provide coordinates contained in a touch region (i.e., a specific region touched by a touch tool such as a user's finger or a stylus pen) to the control unit 160. The control unit 160 may determine touch coordinates from at least one of the coordinates contained in a touch region received from the touch panel 120. The control unit 160 may detect a user's gesture on the basis of variations in touch coordinates continuously received from the touch panel 120. A user's gesture may include and be classified into a touch, a tap, a drag, a long touch, a touch release, a flick, and the like. The control unit 160 may detect a user's gesture on the basis of variations in touch coordinates continuously received from the touch panel 120. A user's gesture may include and be classified into a touch, a tap, a drag, a long touch, a touch release, a flick, and the like. A touch refers to a gesture that makes a touch tool be in contact with any point on the touch panel 120. A tap refers to a gesture that touches any point on the touch panel 120 and then promptly releases the touch tool from the touch point without moving the touch tool. A drag refers to a gesture that moves a touch tool in an arbitrary direction while maintaining a touch on the touch panel 120. A long touch refers to a gesture that touches any point on the touch panel 120 for a certain duration. A touch release refers to a gesture that removes a touch from any point on the touch panel 120. A flick refers to a gesture that moves a touch tool more quickly than a drag and then releases the touch tool. If the touch coordinates received from the touch panel 120 change, the control unit 160 may detect the movement of the touch tool (e.g. finger) and determine the type of the user's touch gesture on the basis of variations in the touch coordinates and, if the touch gesture is the drag and drop or the flick gesture, the control unit 160 may determine the start and end points of the finger and movement angle.

In various embodiments of this disclosure, the control unit 160 may rearrange at least one object on the screen based on the touch event including the start and end points of the finger and movement angle of the touch gesture. For example, if the user makes a touch at a certain area of the screen of the portable electronic device 100 and moves the touch while maintaining the touch, the object may be rearranged on the screen of the portable electronic device 100 through one of symmetric movement, rotation movement and shift. The object rearrangement on the screen of the portable electronic device through the symmetric movement, rotation movement, and shift is described later.

The display panel 130 may display various menu items of the mobile device 100, information entered by a user, or information offered to a user. For example, the display panel 130 may display objects (e.g., application icons, items, files, images, etc.), an indication bar, widgets, a page indicator, and a certain region for executing the object rearrangement function on the screen of the portable electronic device 100. For example, if a touch gesture is detected on the outside of the certain area, the display panel 130 may execute the corresponding function and, otherwise, if the touch gesture is detected within the certain area, the object may be rearranged based on the touch gesture. The certain region may be preset to execute the object rearrangement function so as not to overlap a normal function executed by touch input. The certain region may be preset by a designer's setting or selected by a user's setting.

The display panel 130 may support the object rearrangement function for facilitating selection of the object arranged at a specific position in a restrictive environment such as single hand-holding environment. If it is determined to rearrange the object in response to a user' touch gesture, the display panel 130 may perform one of the symmetrical movement, rotational movement, and shift on the object on the screen of the portable electronic device 100. Here, the symmetrical movement may be classified into one of diagonal symmetrical movement, horizontal symmetrical movement, and vertical symmetrical movement. The rotational movement may be classified into one of clockwise direction movement and counterclockwise direction movement, and the shift may be classified into shift by row and shift by column.

The display panel 130 may be implemented with one of a Liquid Crystal Display (LCD), Light Emitted Diodes (LED), an Active Matrix LED (AMOLED), a Passive Matrix OLED (PMOLED), and the like.

The storage unit 140 is a secondary memory unit of the control unit 160 and may include at least one of disk, Random Access Memory (RAM), and flash memory. The storage unit 140 may store the data generated by the portable electronic device 100 or received from an external device such as a server, a desktop PC, and a tablet PC by means of a radio communication unit (not shown) and an external device interface (not shown) under the control of the control unit 160. The storage unit 140 may store a rearrangement table 150.

The rearrangement table 150 may store data corresponding to rearrangement of the objects displayed on the screen of the portable electronic device 100. The control unit 160 may receive the touch event from the touch panel 120, determine the change of the touch gesture and determine rearrangement of the objects according to the change of the touch gesture. The rearrangement table 150 may store the rearrangement patterns to sort the change of the touch gesture by an angle range. For example, the control unit 160 may determine the change of the touch gesture based on the touch event received from the touch panel 120, search the rearrangement table 150, and determine the rearrangement pattern corresponding to the change of the touch gesture.

The storage unit 140 may store the Operating System (OS) for operating the portable electronic device 100, application programs for optional functions such as audio playback, still and motion picture playback, and broadcast playback, and data generated by the user and received in data communication. The object rearrangement program may include a routine for determining rearrangement of objects based on the touch gesture detected on a certain region, a routine for grouping the objects displayed on the screen into at least one group, and a routine for rearranging the grouped objects according to the object rearrangement determination. The routing of rearranging grouped objects according to the rearrangement determination may include subroutines according to the symmetric movement, rotation movement, and shift.

The control unit 160 controls overall operations of the portable electronic device and signal flows among the internal components of the portable electronic device 100. For example, the control unit 160 may detect the change of the touch gesture input on the touch panel 120, search the rearrangement table 150, and determine the objects rearrangement corresponding to the change of touch gesture.

Further, the control unit 160 may group objects displayed on the screen of the portable electronic device 100 into at least one group. For example, the control unit 160 may group the objects displayed on the screen of the portable electronic device 100 according to a line, e.g. a diagonal line, a horizontal center line, and a vertical center line. The control unit 160 also may group the objects into a region to rotate or shift the grouped objects. The control unit 160 rearranges the grouped objects on the screen of the portable electronic device 100 according to the rearrangement determination. Functions of the control unit 160 are described hereinafter with reference to the accompanying drawings.

In addition to the above described components, the portable electronic device 100 may include a key input unit having a plurality of input keys for receiving alphanumeric input and a plurality function keys for configuring various functions, a camera unit for taking pictures, and an audio processing unit for processing the audio signal associated with the function of the present disclosure and outputting the processed signal to the speaker, although they are not depicted to avoid obscuring the subject matter of the present disclosure.

Figure 2:
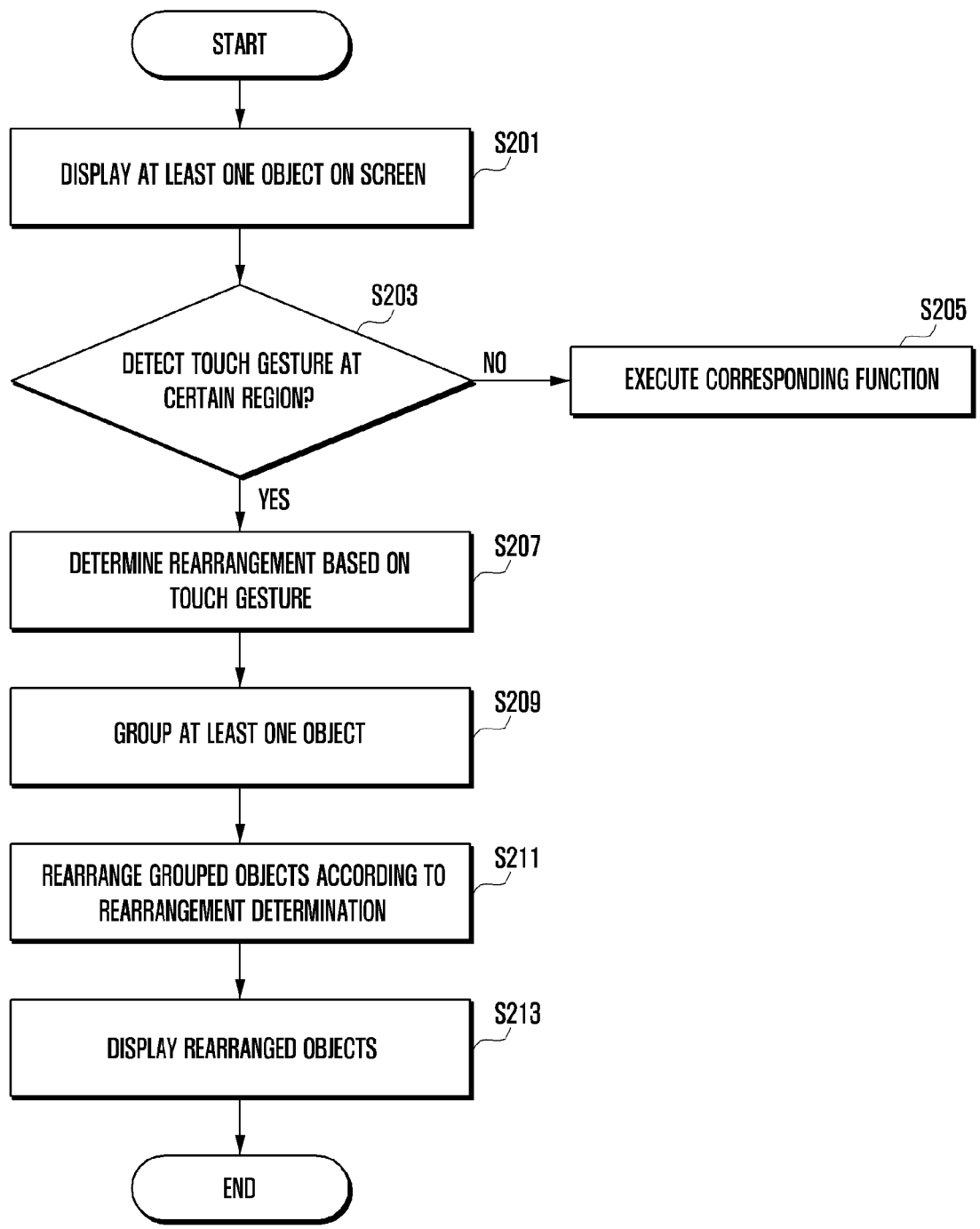
FIG. 2 is a flowchart illustrating an object rearrangement method of a portable electronic device according to an embodiment of the present disclosure.

FIG. 2 is a flowchart illustrating an object rearrangement method of a portable electronic device according to an embodiment of the present disclosure.

Referring to FIG. 2, at least one object may be displayed on the screen of the portable electronic device at operation S201. Here, the screen of the portable electronic device 100 may be a main menu screen. The main menu screen may include an indication bar, widgets, a page indicator, at least one object, and a certain region for rearranging of the at least one object. The control unit 160 may determine whether a touch gesture is detected in a certain region at operation S203. The certain region may be preset to execute the object rearrangement function so as not to overlap a normal function executed by a touch input. The certain region may be preset by a designer's setting or selected by a user's setting. In the case that a touch gesture is detected outside of the certain region on the screen of the portable electronic device 100, the control unit 160 may control to execute the corresponding function at operation S205.

If it is determined that a touch gesture is detected on the certain region at operation S203, the control unit 160 may determine rearrangement of the object based on the change of the touch gesture at operation S207. For example, the control unit 160 may receive the touch event from the touch panel 120 and determine the change of the touch gesture based on the touch event. The control unit 160 may search the rearrangement table 150 for determining the rearrangement pattern of the object corresponding to the change of the touch gesture. Here, the control unit 160 may further determine whether to change the positions of the indication bar, the widgets, and the page indicator displayed on the main menu screen of the portable electronic device 100 according to the object rearrangement determination.

The control unit 160 may group at least one object according to the rearrangement determination at operation S209. For example, if the control unit 160 determines the object rearrangement pattern, the control unit 160 may group the objects displayed on the screen of the portable electronic device 100 according to at least one line, e.g. a diagonal line, a horizontal center line, and a vertical center line. The control unit 160 also may group the objects into a region to rotate or shift the objects.

The control unit 160 may rearrange the grouped objects according to the object rearrangement determination pattern at operation S211. For example, if the objects are grouped based on a line, the control unit 160 may rearrange the objects through symmetrical movement based on the line. If the objects are grouped into a region for rotation movement, the control unit 160 may rotate the objects in a clockwise or a counterclockwise direction to rearrange the objects. If the objects are grouped into a region for shift, the control unit 160 may shift the objects in units of rows or columns to rearrange the objects. Further, the control unit 160 may change the position of the indication bar, the widgets, and the page indicator displayed on the main menu screen of the portable electronic device 100 according to the object rearrangement determination pattern.

The control unit 160 may control the touch screen 110 to display the rearranged objects on the screen of the portable electronic device 100 at operation S213. The control unit 160 may control the symmetrical movement of the object according to a line or to a rotational movement or a shift of a region in which the objects are arranged such that the touch screen 110 may display the rearranged objects on the screen.

Hereinafter, descriptions are made of a method for rearranging objects on a screen of a portable electronic device (i.e., rearranging the objects symmetrically according to a line or to a rotational movement or a shift) with reference to the accompanying drawings.

Figure 3:
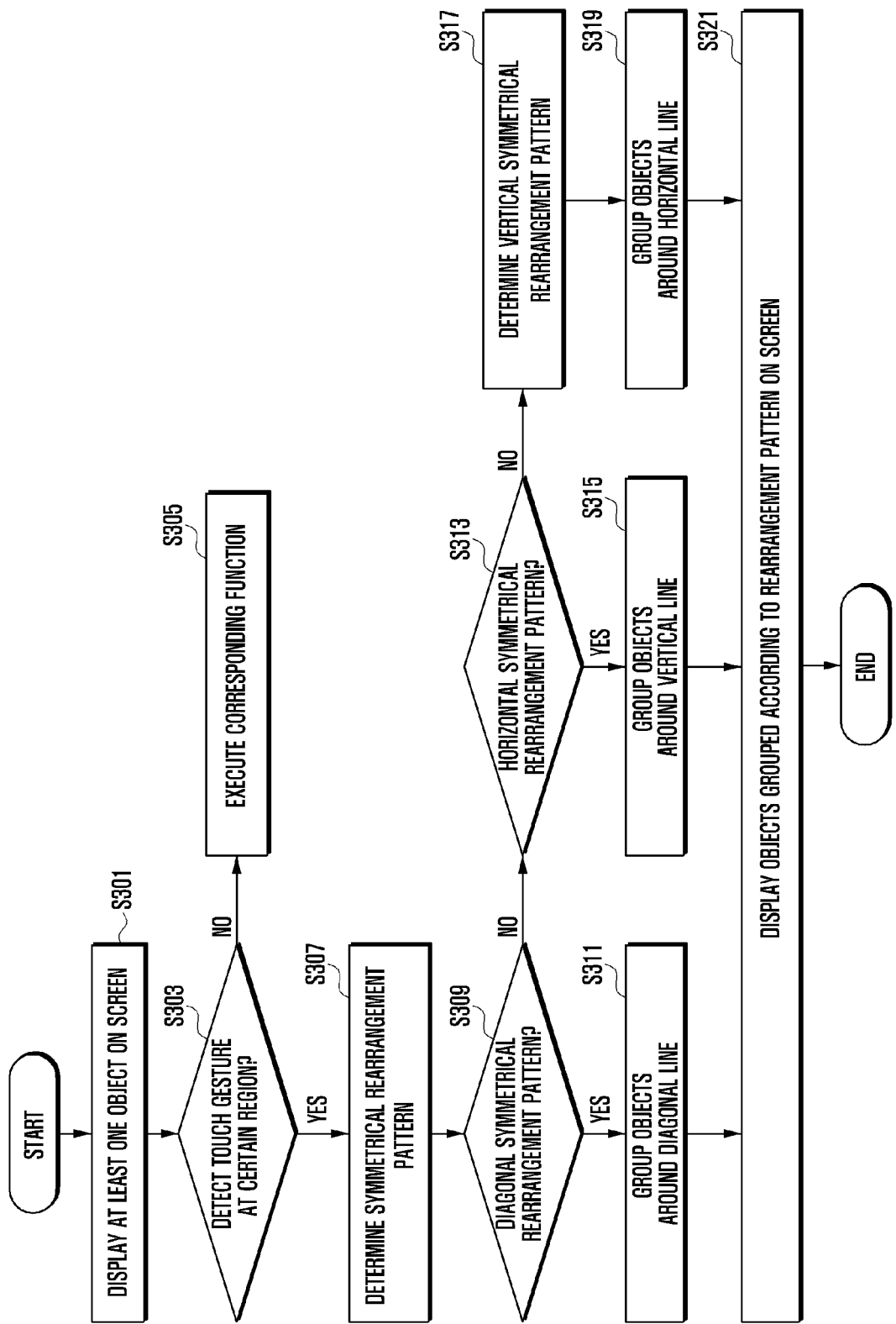
FIG. 3 is a flowchart illustrating a symmetrical object movement procedure of a portable electronic device according to an embodiment of the present disclosure.

FIG. 3 is a flowchart illustrating a symmetrical object movement procedure of a portable electronic device according to an embodiment of the present disclosure.

Figure 4:
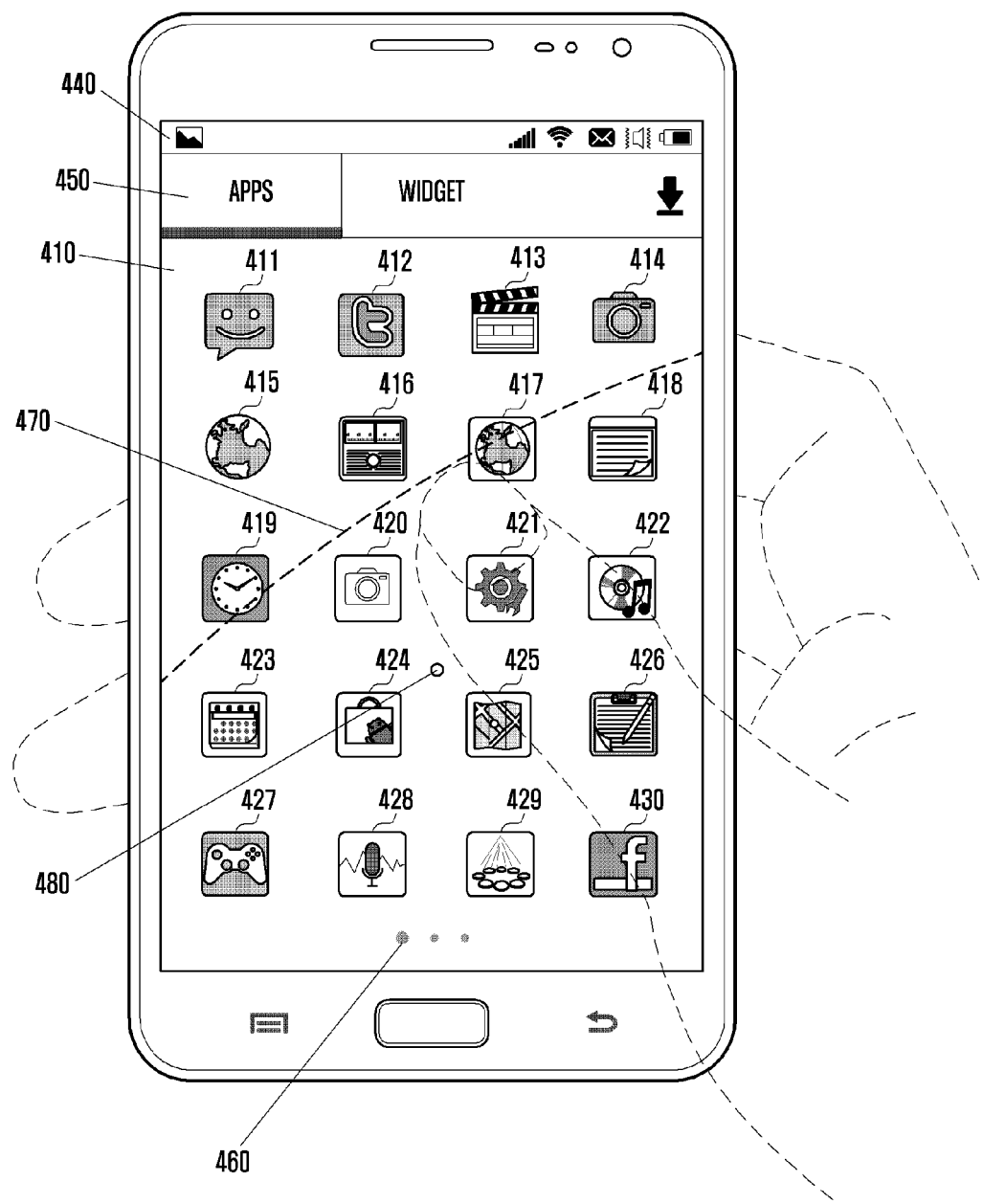
FIG. 4 is a diagram illustrating a situation where a user holds a portable electronic device with one hand for explaining an object display method according to an embodiment of the present disclosure.

FIG. 4 is a diagram illustrating a situation where a user holds a portable electronic device with one hand for explaining an object display method according to an embodiment of the present disclosure.

FIGS. 5A through 7C are diagrams illustrating screen displays for explaining symmetrical object rearrangements according to embodiments of the present disclosure.

Referring to FIG. 3, at least one object may be displayed on the screen of the portable electronic device 100 at operation S301.

Referring to FIG. 4, the objects 411 to 430, an indication bar 440, a widget 450, and a page indicator 460 may be displayed on a background screen 410 of the portable electronic device 100. The screen also may include a certain region 480. The certain region 480 is configured to distinguish the object rearrangement function from another function such as a page turning or a scrolling function. The certain region may be preset by a designer's setting or selected by a user's setting. The certain region may be set anywhere on the screen of the portable electronic device and is preferably within the reach of any finger of the hand that holds the portable electronic device 100.

In FIG. 4, the dotted curve line 470 denotes the range of the reach of the finger of the hand holding the portable electronic device 100 and is not actually drawn on the screen. The objects 417 and 419 on which the dotted curve line 470 is crossing may not be touched exactly for executing a function respectively corresponding to the objects 417 and 419. Also, it is difficult for the user to execute a function respectively corresponding to the objects 411 to 416 by touching the objects 411 to 416 positioned above the curved line 470 (i.e., out of the reach of the finger of the hand holding the portable electronic device). A description is made of a method for rearranging the out-of-finger-reach objects 411 to 416 and the objects 417 and 419 to be placed below the curve line 470 (i.e., within the reach of the finger).

The control unit 160 may determine whether a touch gesture is detected on the certain region 480 at operation S303. Since operation S303 is substantially identical with operation S203 of FIG. 2, a description thereof is omitted herein.

If the touch gesture is detected outside the certain region 480 on the screen of the portable electronic device 100, the control unit 160 may control to execute a corresponding or normal function (e.g., turning or scrolling the page) at operation S305.

The control unit 160 may determine a rearrangement pattern of the objects through symmetrical movement according to the touch gesture at operation S307. For example, the control unit 160 may determine the change of the touch gesture based on the touch event received from the touch panel 120. The control unit 160 may search the rearrangement table 150 for determining the rearrangement pattern corresponding to the touch gesture. Table 1 is an exemplary rearrangement table 150 for symmetrical movement of the objects stored in the storage unit 140. The rearrangement table 150 expresses the change range of the touch gesture with angle based on the rectangular coordinate system of the 2-dimensional plane and divides the 2-dimensional plane into 8 sections at every 45° about the origin point of the rectangular coordinate system. The control unit 160 may determine the rearrangement pattern of the objects according to the movement angle of the touch gesture.

TABLE 1

| Movement angle of touch gesture (unit: °(degree)) | Object rearrangement pattern |
| --- | --- |
| −22.5°~22.5° | Horizontal symmetry |
| 22.5°~67.5° | First diagonal symmetry |
| 67.5°~112.5° | Vertical symmetry |
| 112.5°~157.5° | Second diagonal symmetry |
| 157.5°~202.5° | Horizontal symmetry |
| 202.5°~247.5° | First diagonal symmetry |
| 247.5°~292.5° | Vertical symmetry |
| 292.5°~337.5° | Second diagonal symmetry |

Figure 5A:
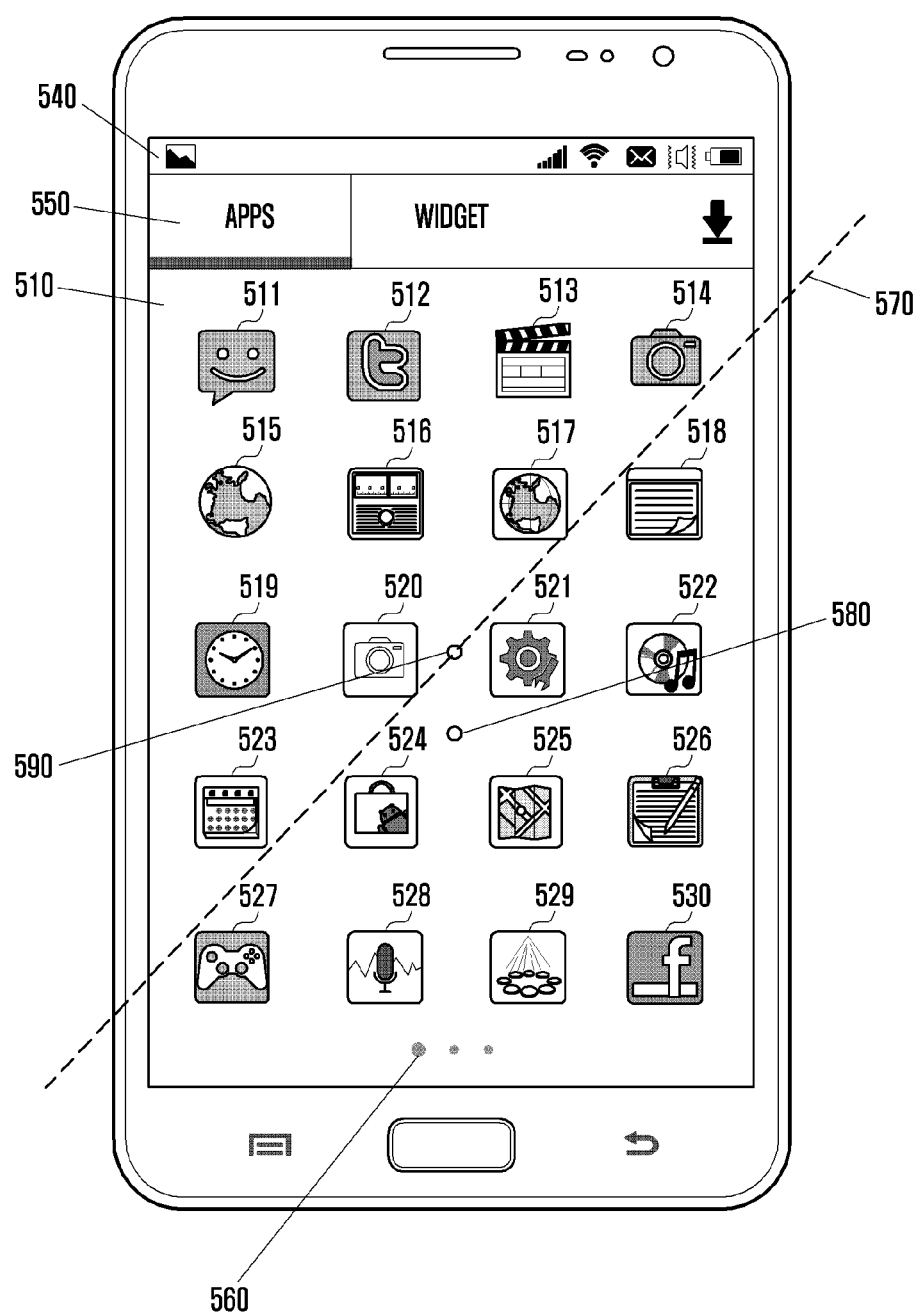
FIGS. 5A and 5B are diagrams illustrating screen displays for explaining diagonal symmetrical object rearrangement according to an embodiment of the present disclosure.
Figure 5B:
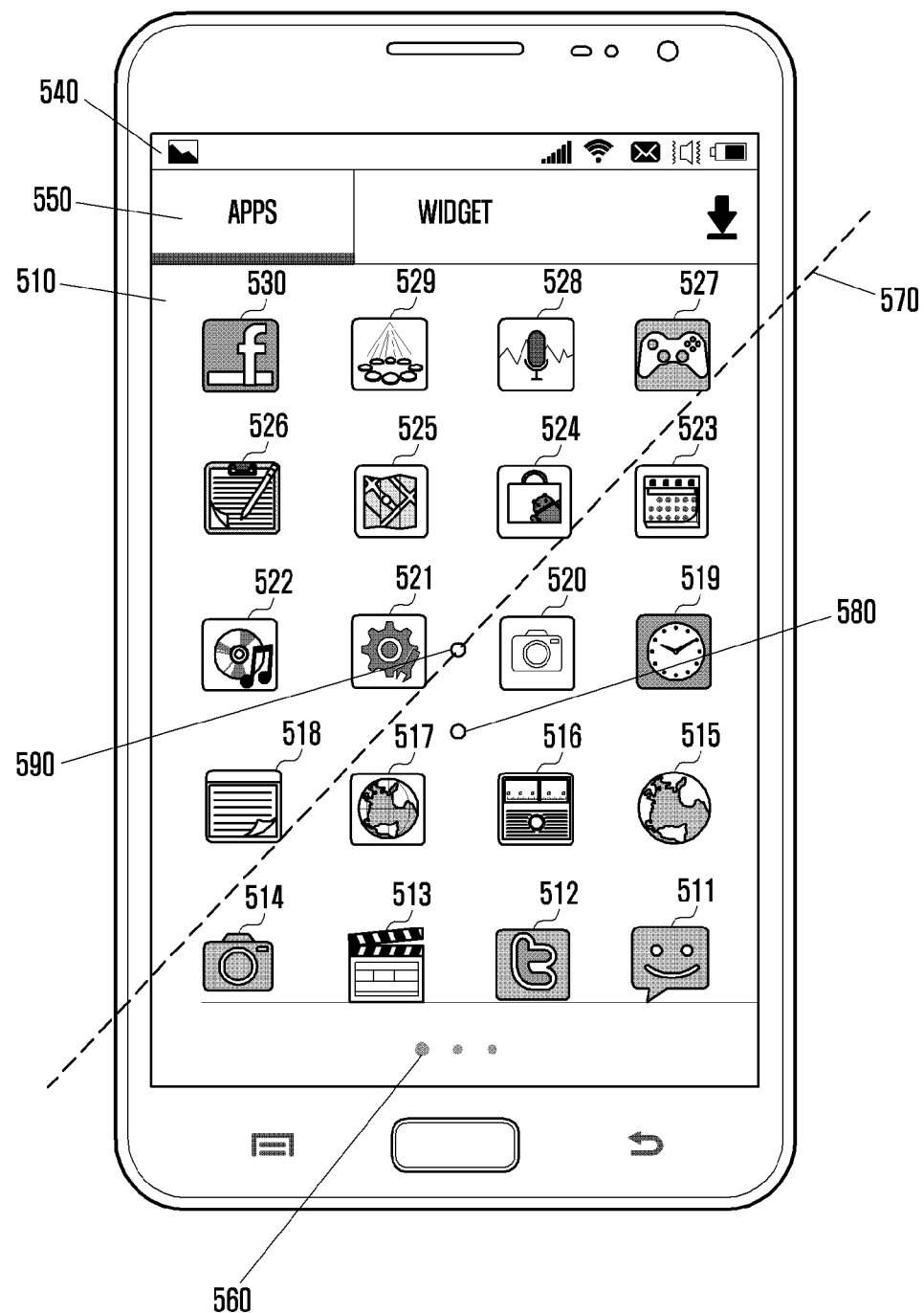

Referring to FIGS. 5A and 5B, the first diagonal symmetry denotes the symmetry around a straight line running from the top left to the bottom right of the screen, and the second diagonal symmetry denotes a symmetrical movement based on the straight line running from the top right to the bottom left of the screen. For example, in FIG. 5A, if the user makes a touch onto the certain region 580 and drags in the direction of 330° (i.e. −30°), the control unit 160 may search for the second diagonal symmetry movement based on the second diagonal line 570 as the rearrangement pattern from Table 1 of the rearrangement table 150. Although an embodiment of the present disclosure is directed to an exemplary case of determining the object rearrangement pattern based on Table 1, the rearrangement table 150 is not limited to Table 1. For example, Table 1 shows a case where the object rearrangement method of the portable electronic device 100 is performed with at least one of diagonal symmetry, horizontal symmetry, and vertical symmetry; but if the object rearrangement method is configured to rearrange the objects with only one of diagonal symmetry, horizontal symmetry, and vertical symmetry, Table 1 may be configured differently. For example, if the object rearrangement method of the present disclosure is configured to operate with the horizontal symmetry rearrangement function and vertical symmetry rearrangement function, the control unit 160 may set the object rearrangement pattern by dividing the 2-dimensional plane into 4 sections per 90° around the origin point for the movement range of the touch gesture as shown in Table 2.

TABLE 2

| Movement angle of touch gesture (unit: °(degree)) | Object rearrangement pattern |
|---|---|
| −45°~45° | Horizontal symmetry |
| 45°~135° | Vertical symmetry |
| 135°~225° | Horizontal symmetry |
| 225°~315° | Vertical symmetry |

Figure 7A:
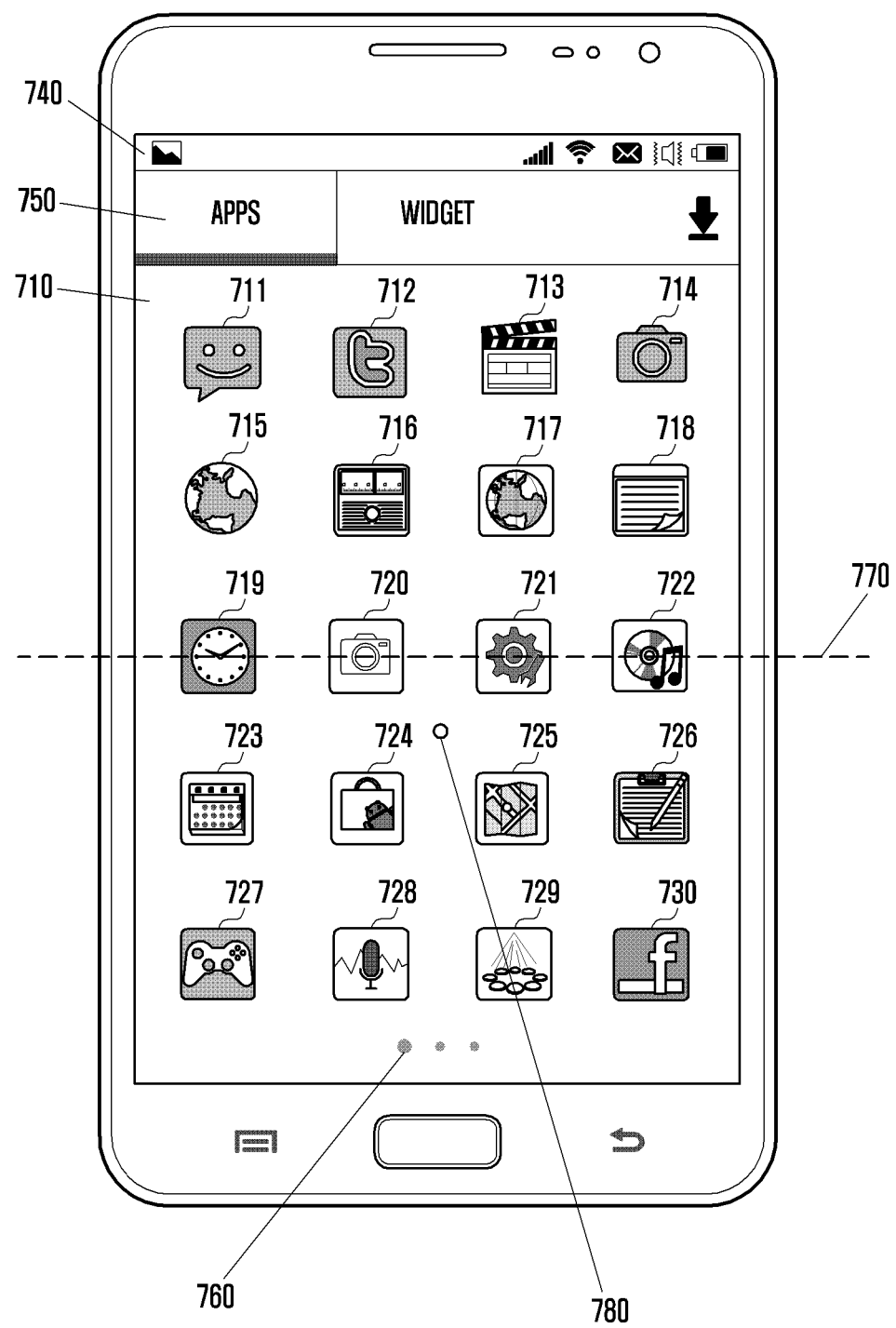
FIGS. 7A, 7B, and 7C are diagrams illustrating screen displays for explaining vertical symmetrical object rearrangement according to an embodiment of the present disclosure.
Figure 7B:
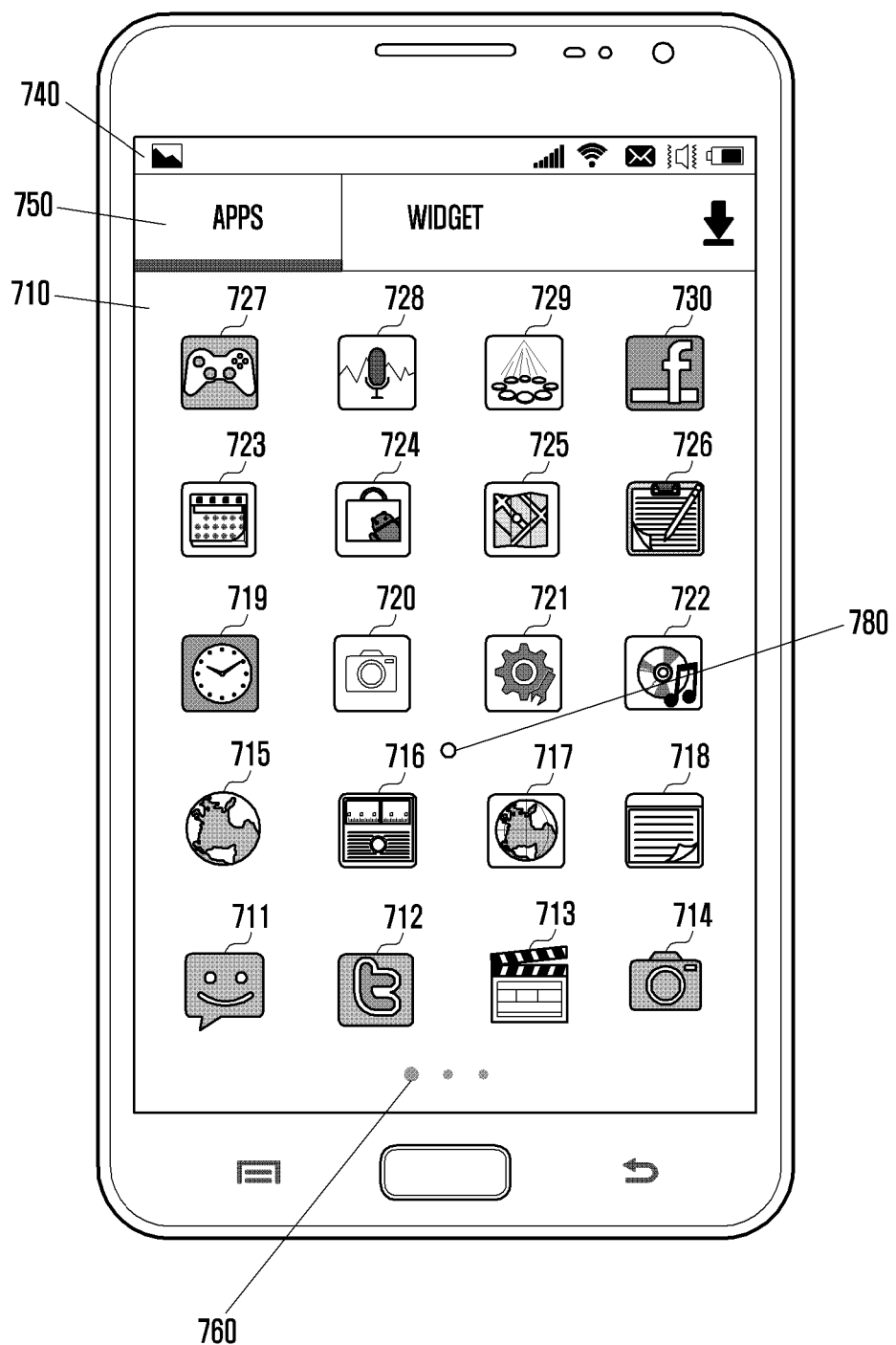
Figure 7C:
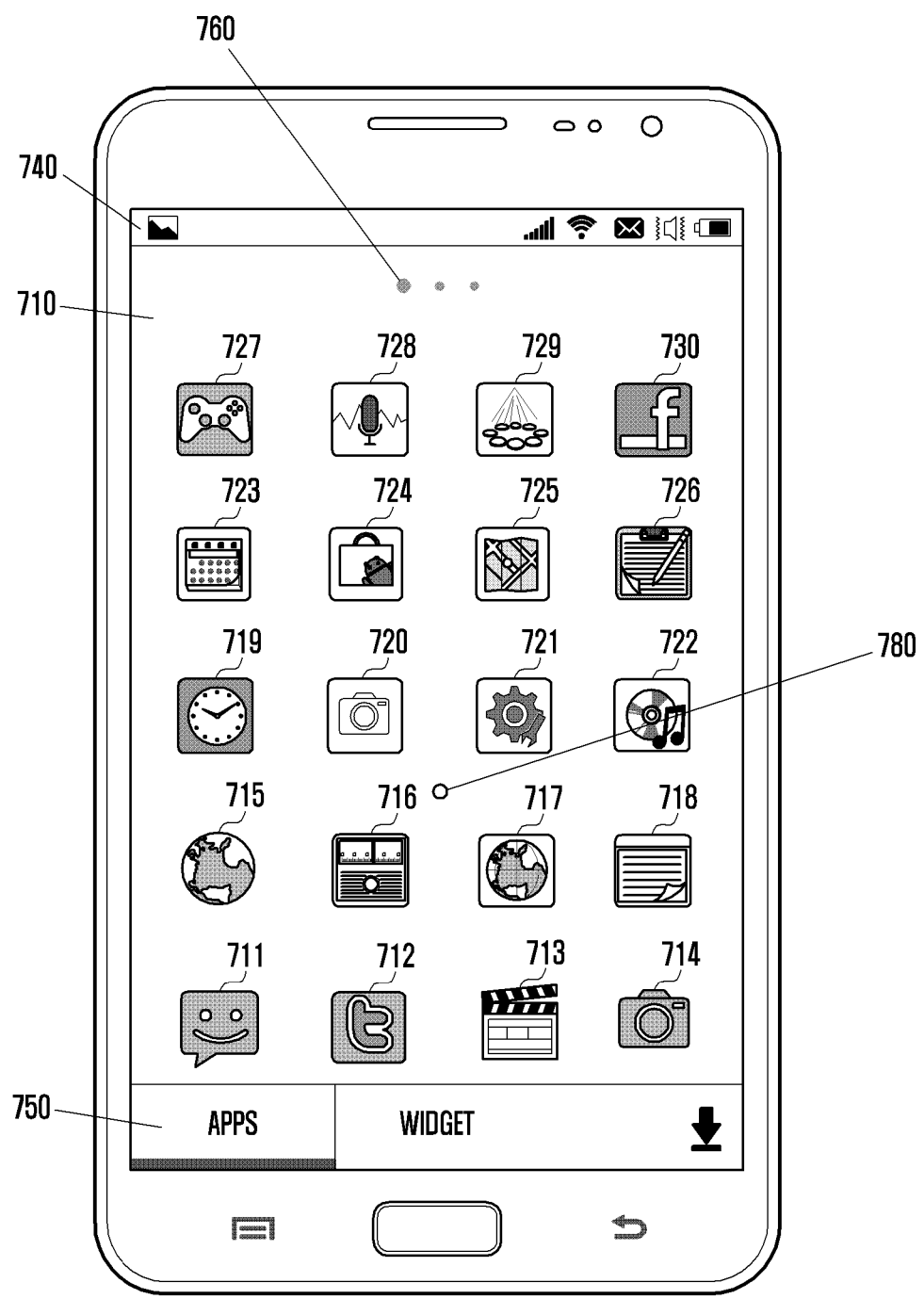

Referring to FIGS. 7A to 7C, the control unit 160 may further determine the change of the indication bar 740, the widgets 750, and the page indicator 760 in position according to the object rearrangement pattern. When the objects are rearranged through a vertically symmetrical movement relative to the certain region 780, the control unit 160 may control the indication bar 740 and widgets 750 to be rearranged from the bottom of the display panel 130 and the page indicator 760 to the top of the display panel. Moreover, the control unit 160 may further change only the positions of the indication bar 740 and the widgets 750 while maintaining the position of the page indicator 760.

Referring again to FIGS. 5A and 5B, the control unit 160 may determine whether the object rearrangement pattern is a diagonal symmetry rearrangement pattern at operation S309. If the object rearrangement pattern is a diagonal symmetry rearrangement pattern, the control unit 160 may group the objects based on the diagonal line 570 at operation S311. Here, the control unit 160 may set a diagonal line 570 to rearrange the objects 417 and 419 crossed by the dotted curve line 470 and the objects 411 to 416 positioned above the dotted curve line 470 to be in the reach of the finger of the user's hand holding the portable electronic device 100. For example, the control unit 150 may group the objects into two group with the objects 511 to 517, 519, 520, and 523 located at the top left side of the diagonal line 570 and the other group with the objects 518, 521, 522, and 524 to 530 located at the bottom right side of the diagonal line 570 on the background screen 510. As shown in FIG. 5B, the indication bar 540, widgets 550, and page indicator 560 may remain in position on the main menu screen of the portable electronic device 100.

Figure 6A:
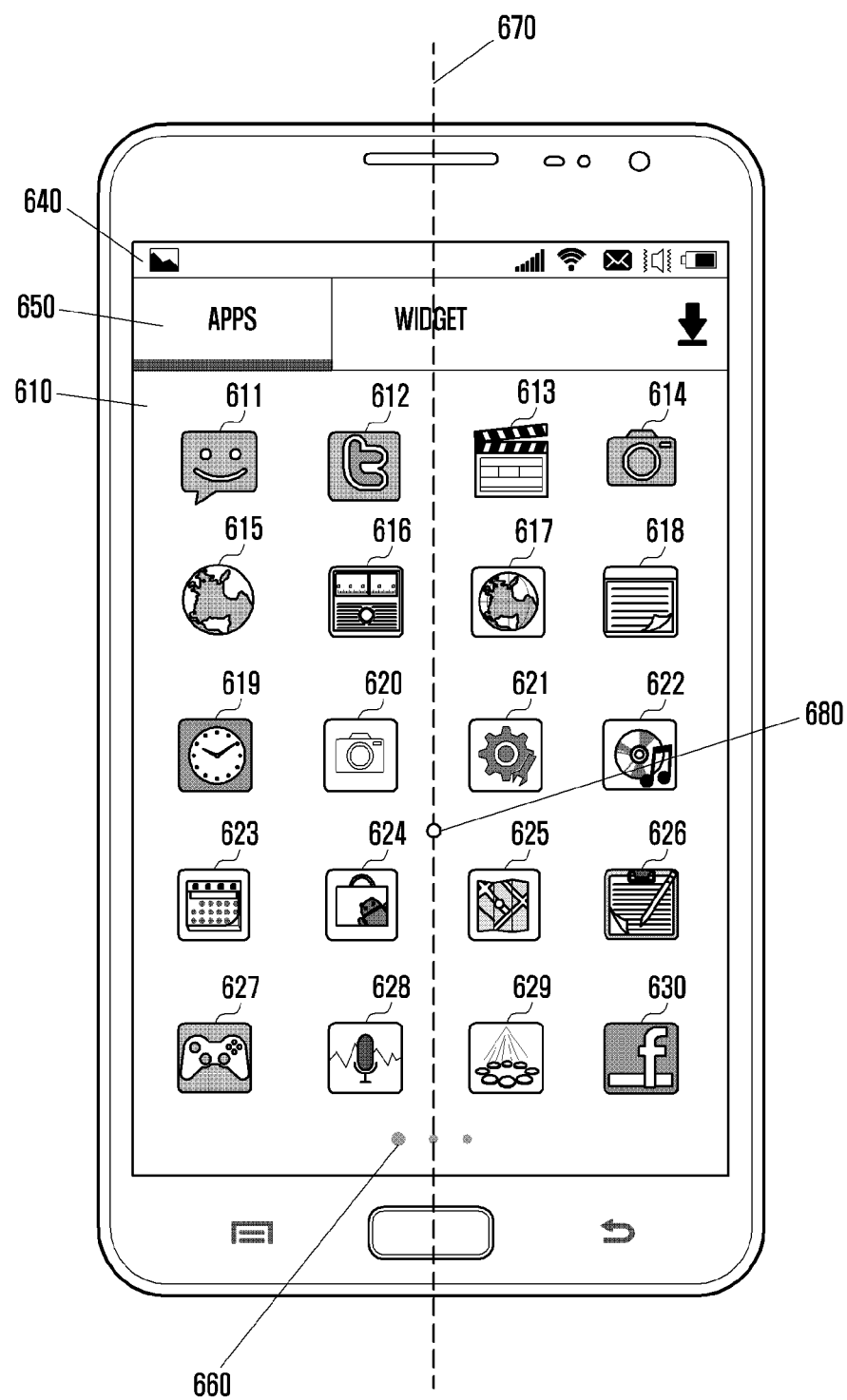
FIGS. 6A and 6B are diagrams illustrating screen displays for explaining horizontal symmetrical object rearrangement according to an embodiment of the present disclosure.
Figure 6B:
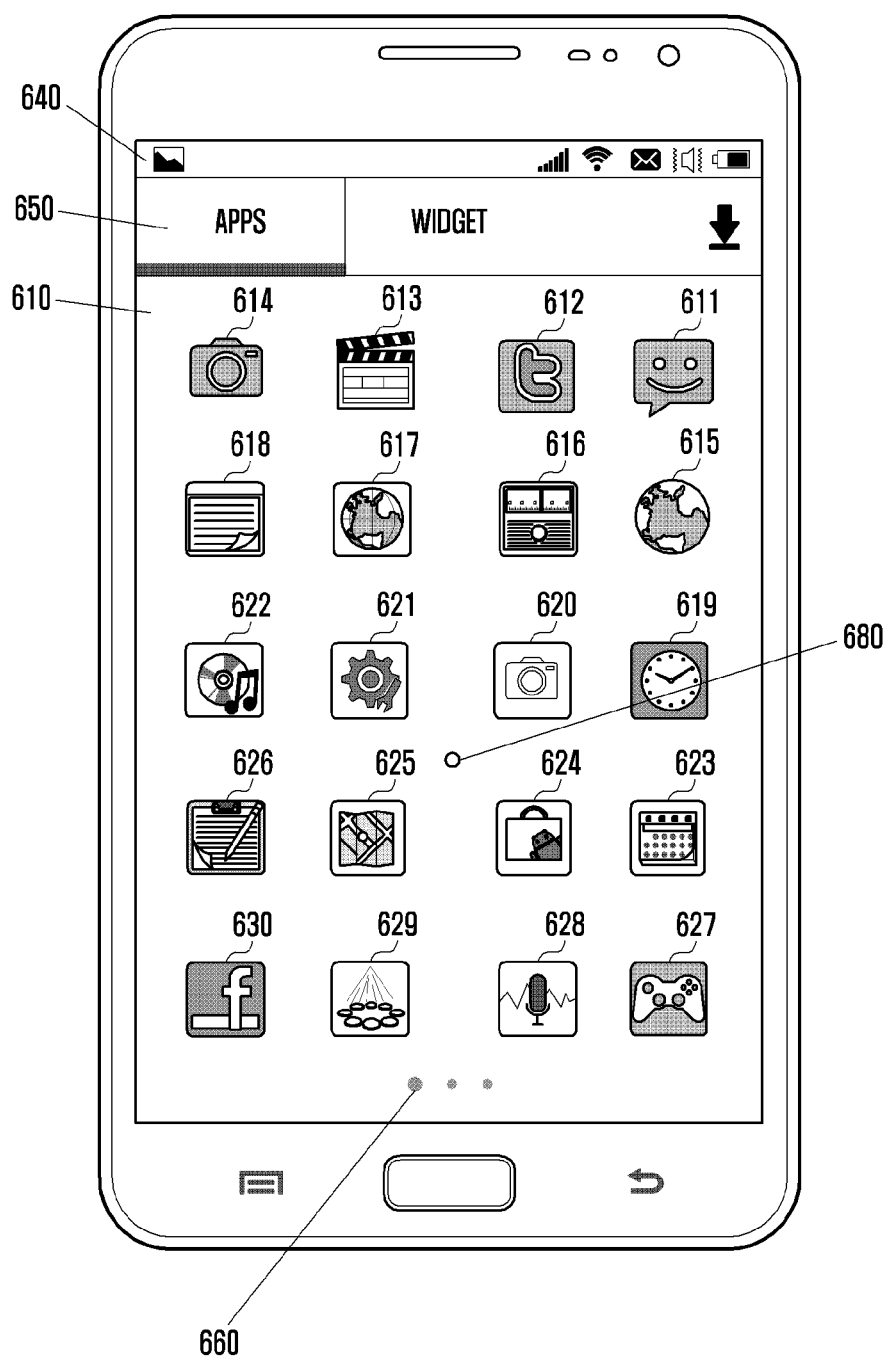

Referring to FIGS. 6A and 6B, if the object rearrangement pattern is not the diagonal symmetry rearrangement pattern at operation S309, the control unit 160 determines whether the object rearrangement pattern is the horizontal symmetry rearrangement pattern at operation S313. If it is determined that the object rearrangement pattern is the horizontal symmetry rearrangement pattern, the control unit 160 groups the objects based on a vertical center line 670 at operation S315 corresponding to certain region 680. Here, the vertical center line 670 may be set as the line crossing the center points of the objects of the middle column when there are an odd number of columns of the objects on the background screen 610 or the line passing between two middle columns of the objects when there are an even number of columns of the objects. In the case of FIG. 6A, as the number of the columns is 4 (i.e., an even number), the vertical center line 670 is set as the line passing between the column including objects 612, 616, 620, 624, and 628 and another column including objects 613, 617, 621, 625, and 629. Here, the control unit 160 may group the objects 611, 612, 615, 616, 619, 620, 623, 624, 627, and 628 arranged at the left side of the vertical center line 670 into one group and the objects 613, 614, 617, 618, 621, 622, 625, 626, 629, and 630 arranged at the right side of the vertical center line 670 into another group. As shown in FIG. 6B, the indication bar 640, widgets 650, and the page indicator 660 may remain in position on the main menu screen of the portable electronic device 100.

If it is determined that the object rearrangement pattern is not the horizontal symmetry rearrangement pattern at operation S313, the control unit 160 may determine that the object rearrangement pattern is the vertical symmetry rearrangement pattern at operation S317 and thus group the objects based on a horizontal center line 770 at operation S319. Here, if the objects are arranged in an odd number of rows, the horizontal center line 770 may be the line crossing the center points of the objects arranged on the middle row of the objects on the background screen 710. Otherwise if the objects are arranged in an even number of rows, the horizontal center line 770 may be the line passing between the two middle rows of objects. In the case of FIG. 7A, the control unit 160 may group the objects 711 to 718 above the horizontal center line 770 into one group and the objects 723 to 730 below the horizontal center line 770 into another group.

The control unit 160 may rearrange the grouped objects on the screen of the portable electronic device 100 according to the rearrangement pattern at operation S321. For example, the control unit 160 rearranges the grouped objects based on one of the diagonal line 570, the vertical center line 670, and the horizontal center line 770 according to the rearrangement pattern determined at operation S307. In the case of the diagonal symmetry rearrangement, the control unit 160 may rearrange the grouped objects based on the second diagonal line 570 as shown in FIG. 5B. Here, the objects may be rearranged symmetrically around the center point 590. Comparing FIGS. 5A with 5B, the object 511 may be switched with the object 530 in position through symmetrical movement around the center point 590, and the object 512 may be switched with the object 529 through symmetrical movement. However, the symmetrical rearrangement is not limited thereto but may be implemented in various ways. In the case of the horizontal symmetry rearrangement, the control unit 160 may rearrange the objects to be symmetrical based on the vertical center line 670 as shown in FIGS. 6A and 6B. For example, the object 611 may be switched with the object 614 in position symmetrically around the vertical center line 670, and the object 612 may be switched with the object 613 symmetrically around the vertical center line 670.

In the case of the vertical symmetry rearrangement, the control unit 160 may rearrange the objects to be symmetrical based on the horizontal center line 770 as shown in FIGS. 7A and 7B. For example, the object 711 may be switched with the object 727 symmetrically around the horizontal center line 770, and the object 712 may be switched with the object 728 symmetrically around the horizontal center line 770. For example, as shown in FIG. 7C, the indication bar 740, widgets 750, and page indicator 760 may be changed in position on the main menu screen of the portable electronic device 100. Referring to FIGS. 7A and 7C, the widgets 750 arranged at the top side of the display panel 130 may be moved to the bottom side of the display panel 130, and the page indicator 760 arranged at the bottom side of the display panel 130 may be moved to the top side of the display panel 130. Although not depicted, the indication bar 740 and the widgets 750 may be rearranged to the bottom side while the page indicator 760 maintain its position.

Figure 8:
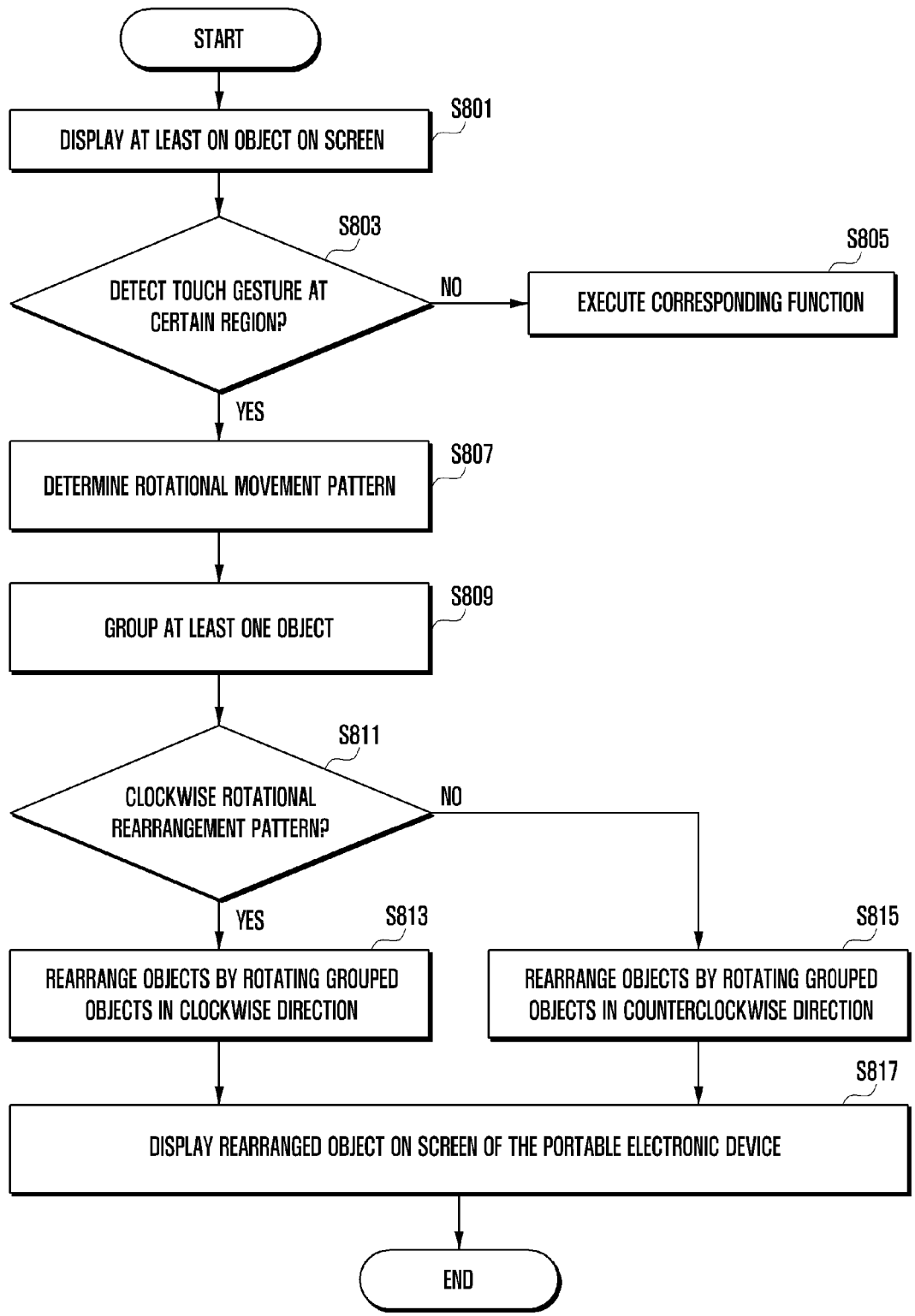
FIG. 8 is a flowchart illustrating an object rotation movement procedure according to an embodiment of the present disclosure.

FIG. 8 is a flowchart illustrating an object rotation movement procedure according to an embodiment of the present disclosure.

FIGS. 9A to 9D are diagrams illustrating screen displays for explaining an object rotation movement according to an embodiment of the present disclosure. Hereinafter, a description is made with reference to FIGS. 8 and 9A to 9D. Since operations S801, S803, and S805 are substantially identical with operations S301, S303, and S305 of FIG. 3, descriptions thereof are omitted herein.

Referring to FIG. 8, the control unit 160 determines that the object rearrangement pattern is the rotational rearrangement pattern based on the touch gesture made at a certain region at operation S807. For example, the control unit 160 may receive a touch event from the touch panel 120, determine the rearrangement pattern based on the touch event, and search the rearrangement table 150 of the storage unit 140 to retrieve the rotational rearrangement pattern. Here, the rotational rearrangement pattern may be one of the clockwise rotational rearrangement pattern or the counterclockwise rotational rearrangement pattern. The rotational rearrangement pattern may be determined in various ways. For example, in the case that the movement angle range of the touch gesture (e.g., drag or flick) corresponds to 0°~180° on the rectangular coordinate system of a 2-dimensional plane, the object rearrangement pattern may be determined as the counterclockwise rotational rearrangement pattern. In the case that the movement angle range of the touch gesture corresponds to 180°~360° in the rearrangement table 150, the object rearrangement pattern may be determined as the clockwise rotational rearrangement pattern. In the case that the movement angle range of the touch gesture corresponds to −90°~90° in the rearrangement table 150, the object rearrangement pattern may be determined as the clockwise rotational rearrangement pattern. According to an embodiment of the present disclosure, if a touch gesture drawing a circle in the clockwise or counterclockwise direction is detected, the control unit 160 may determine the rearrangement pattern to correspond to a rotation movement of the touch gesture. For example, if the user inputs a drag gesture drawing a circle clockwise after touching a certain region, the control unit 160 determines the object rearrangement pattern as the clockwise rotational rearrangement pattern.

The control unit 160 may group at least one object displayed on the screen at operation S809.

Referring to FIGS. 9A to 9D, the objects 911 to 930 are grouped into 6 groups at certain regions. Here, the first to sixth regions 931 to 936 may be preset on a background screen 910 to group the objects for rotational movement.

Figure 9A:
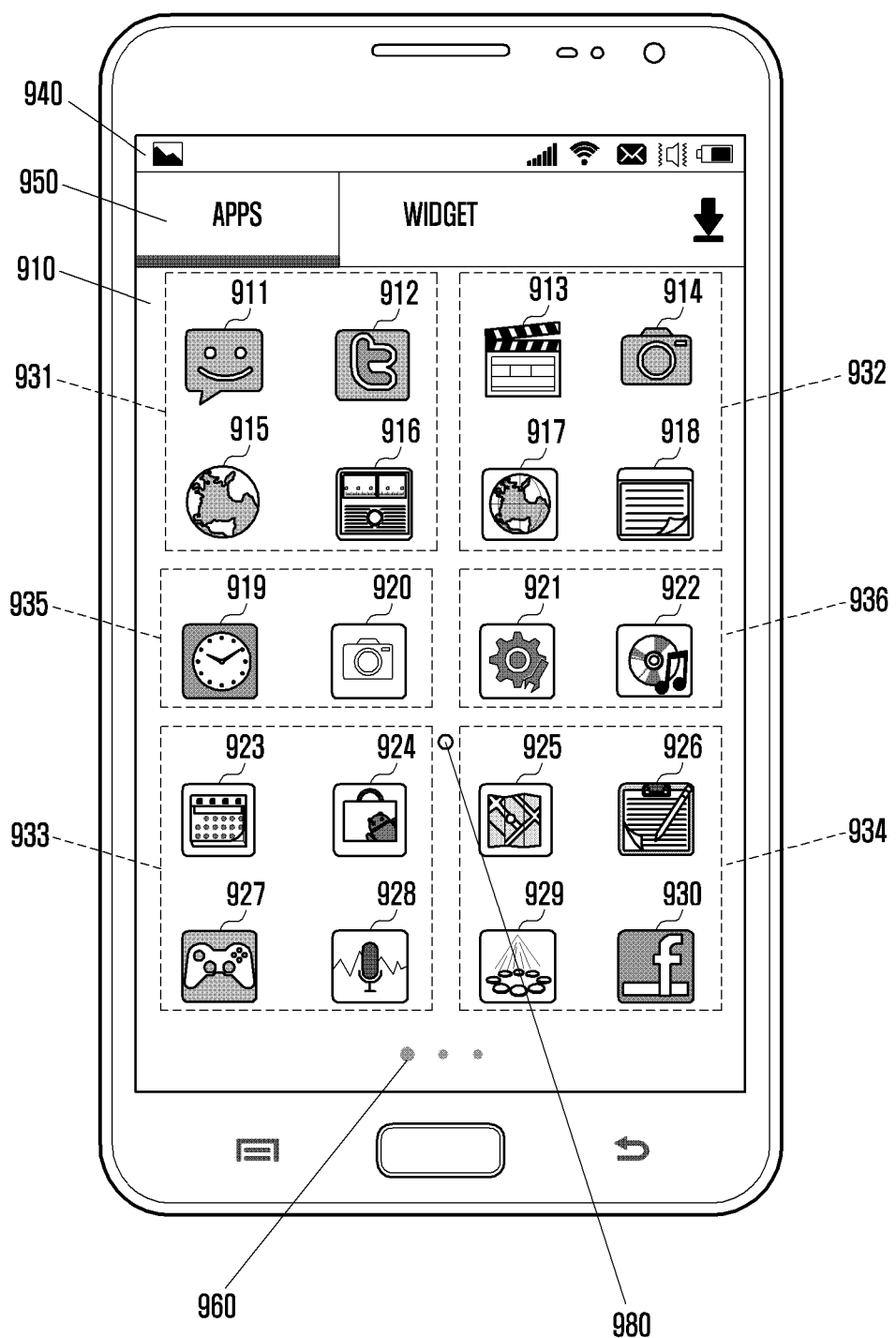
FIGS. 9A, 9B, 9C, and 9D are diagrams illustrating screen displays for explaining an object rotation movement according to an embodiment of the present disclosure.
Figure 9B:
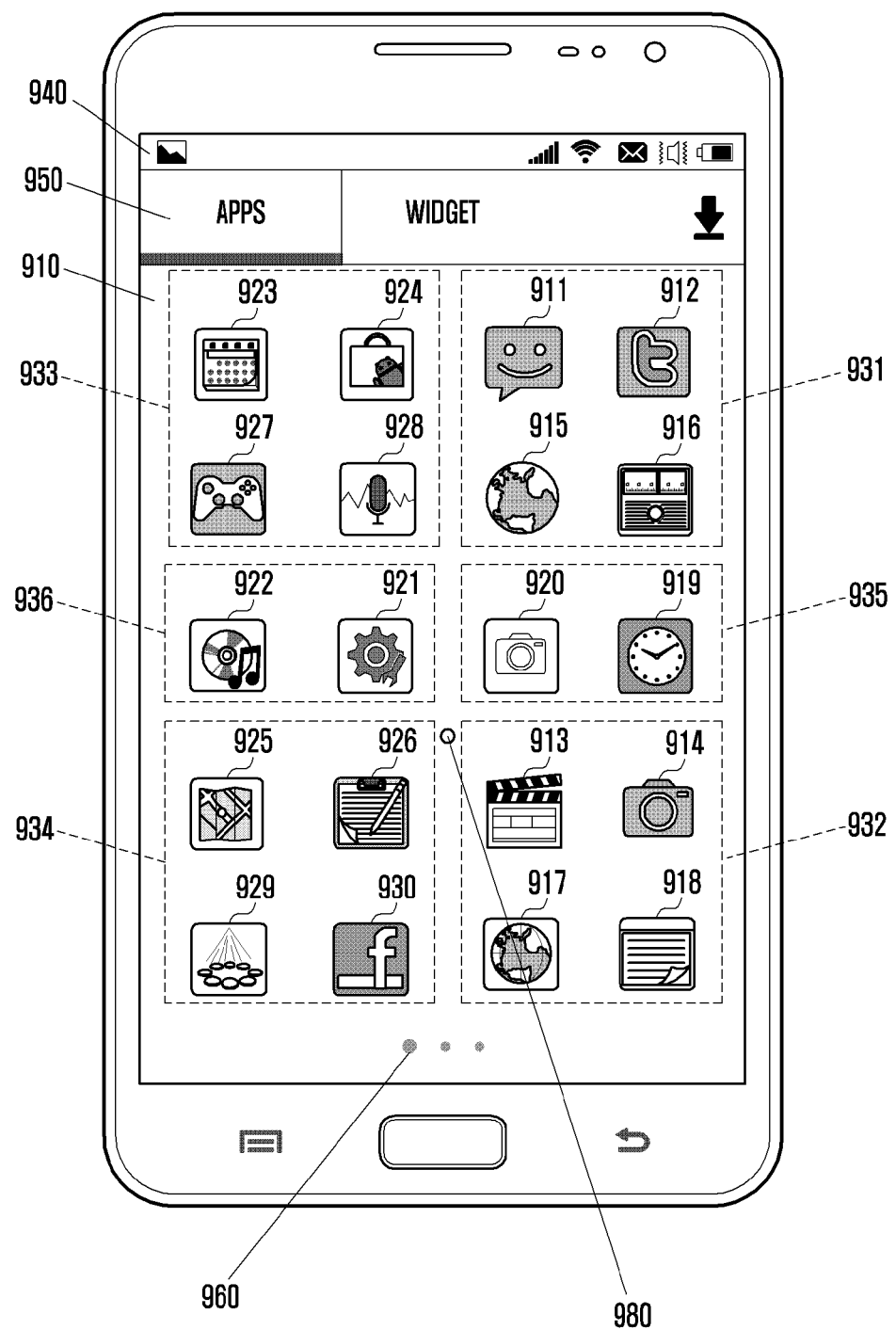

The control unit 160 may determine whether the object rearrangement pattern is the clockwise rotational movement pattern at operation S811. If the object rearrangement pattern is the clockwise rotational movement pattern, the control unit 160 may rearrange the grouped objects by rotating the regions clockwise at operation S813. For example, the control unit 160 may rotate the objects of the first region 931 to the second region 932, the objects of the second region 932 to the fourth region 934, the objects of the fourth region 934 to the third region 933, and the objects of the third region 933 to the first region 931 through a rotation of as much as 90° in the clockwise direction as shown in FIG. 9B. The control unit 160 may also rearrange the objects of the fifth region 935 and the sixth region 936 through rotation of as much as 180°. As also shown in FIG. 9B, an indication bar 940, a widget 950, and a page indicator 960 may remain in position on the main menu screen of the portable electronic device 100.

Figure 9C:
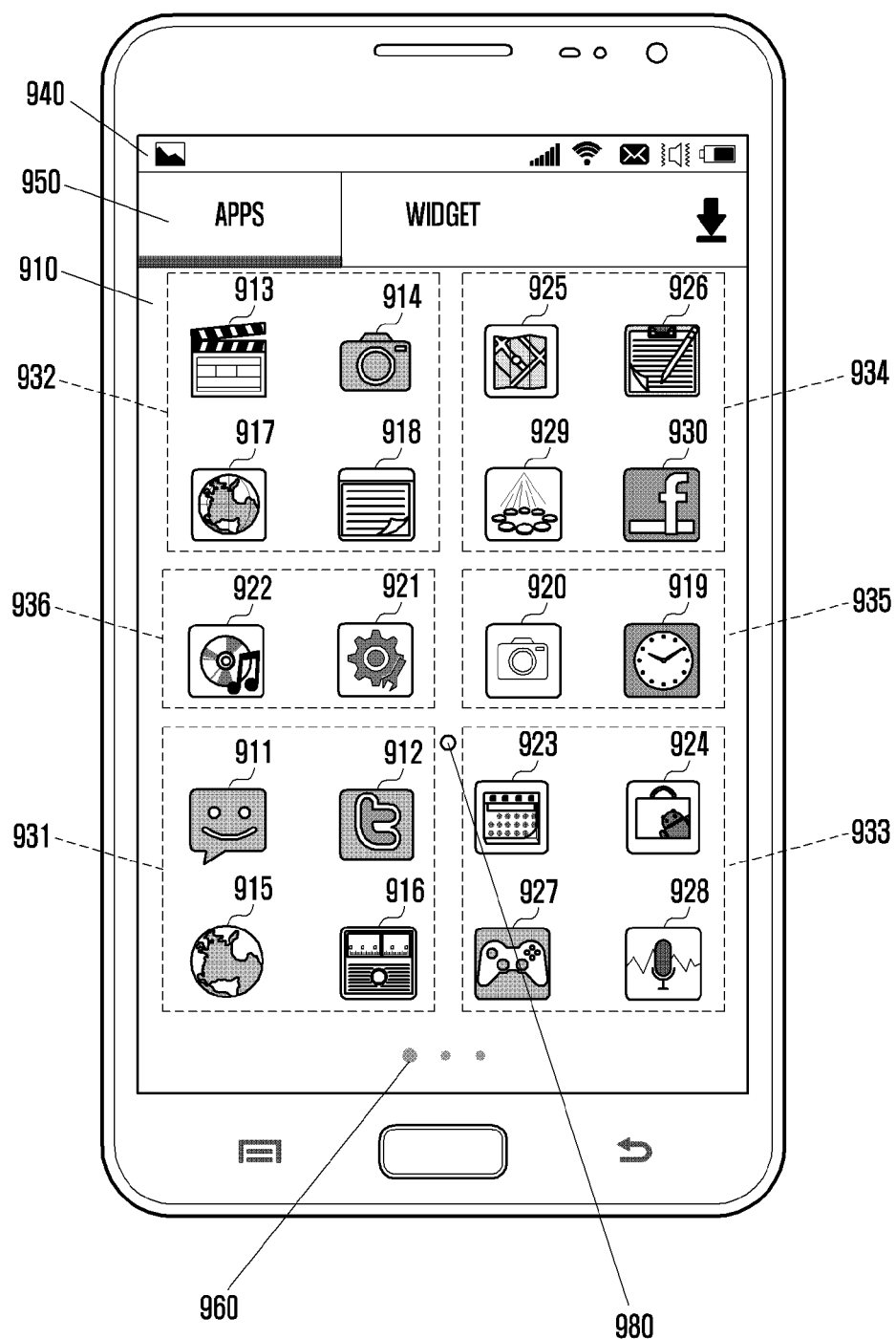
Figure 9D:
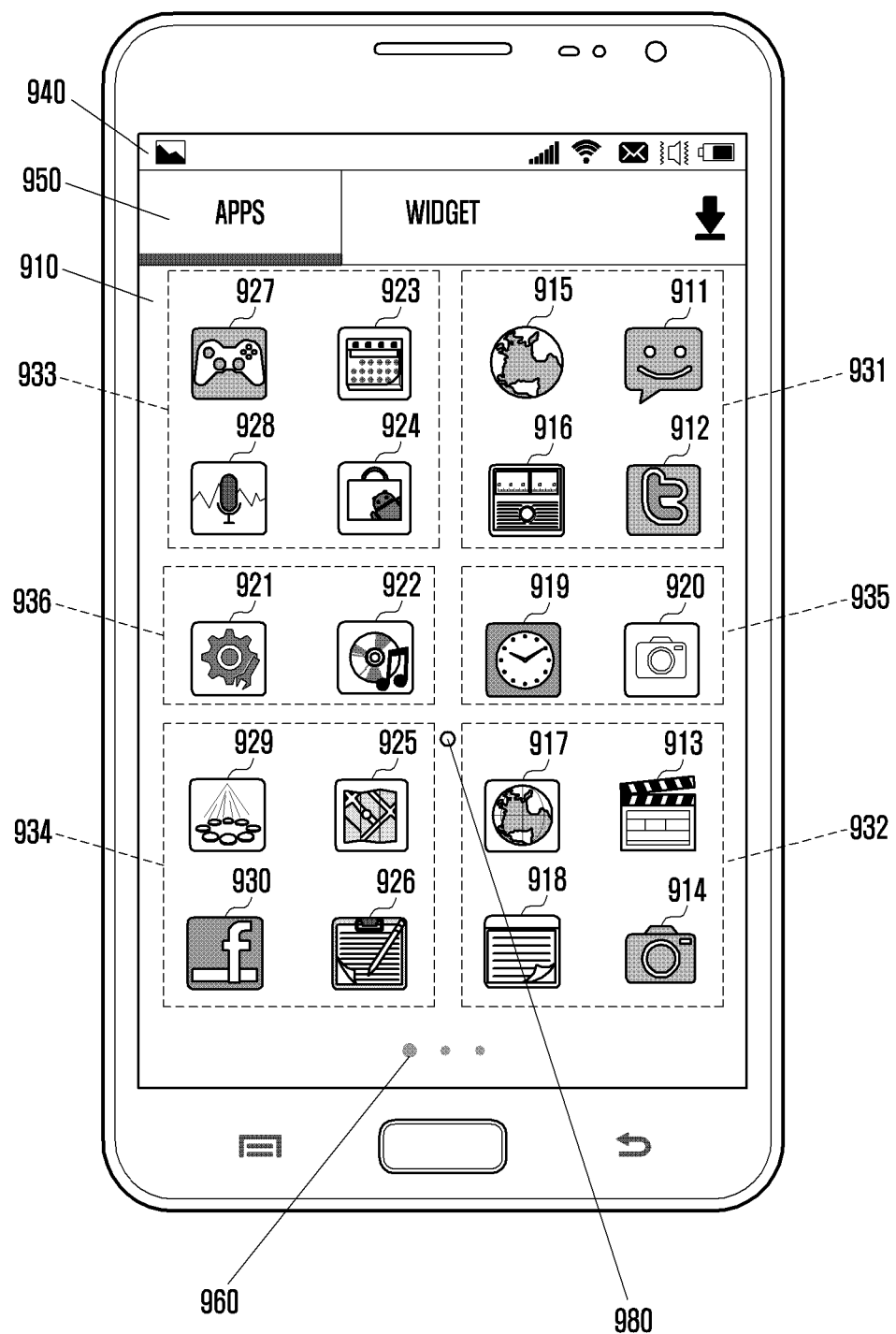

Meanwhile, if the object rearrangement pattern is not the clockwise rotational movement pattern, the control unit 160 may rearrange the grouped objects by rotating the regions counterclockwise direction at operation S815. For example, the control unit 160 may rearrange the grouped objects of the first region 931 to the third region 933, the objects of the second region 932 to the first region 931, the objects of the fourth region 934 to the second region 932, and the objects of the third region 933 to the fourth region through a rotation of as much as 90° in the counterclockwise direction as shown in FIG. 9C. The control unit 160 may also rearrange the objects of the fifth region 935 and the objects of the sixth region 936 through rotation as much as 180°.

According to an embodiment of the present disclosure, the control unit 160 may rotate the objects included in each region in the clockwise or counterclockwise direction at the same time as the objects of the first to sixth regions 931 to 936 are rotated in the clockwise or counterclockwise direction. Comparing FIGS. 9B with 9D, the objects 923, 924, 927, and 928 of the first region 931 may be rotated in the clockwise direction while the objects of the first to sixth regions 931 to 936 are rotated in the clockwise direction.

The control unit 160 may control the touch screen 110 to display the rearranged objects on the screen of the portable electronic device at operation S817.

Figure 10:
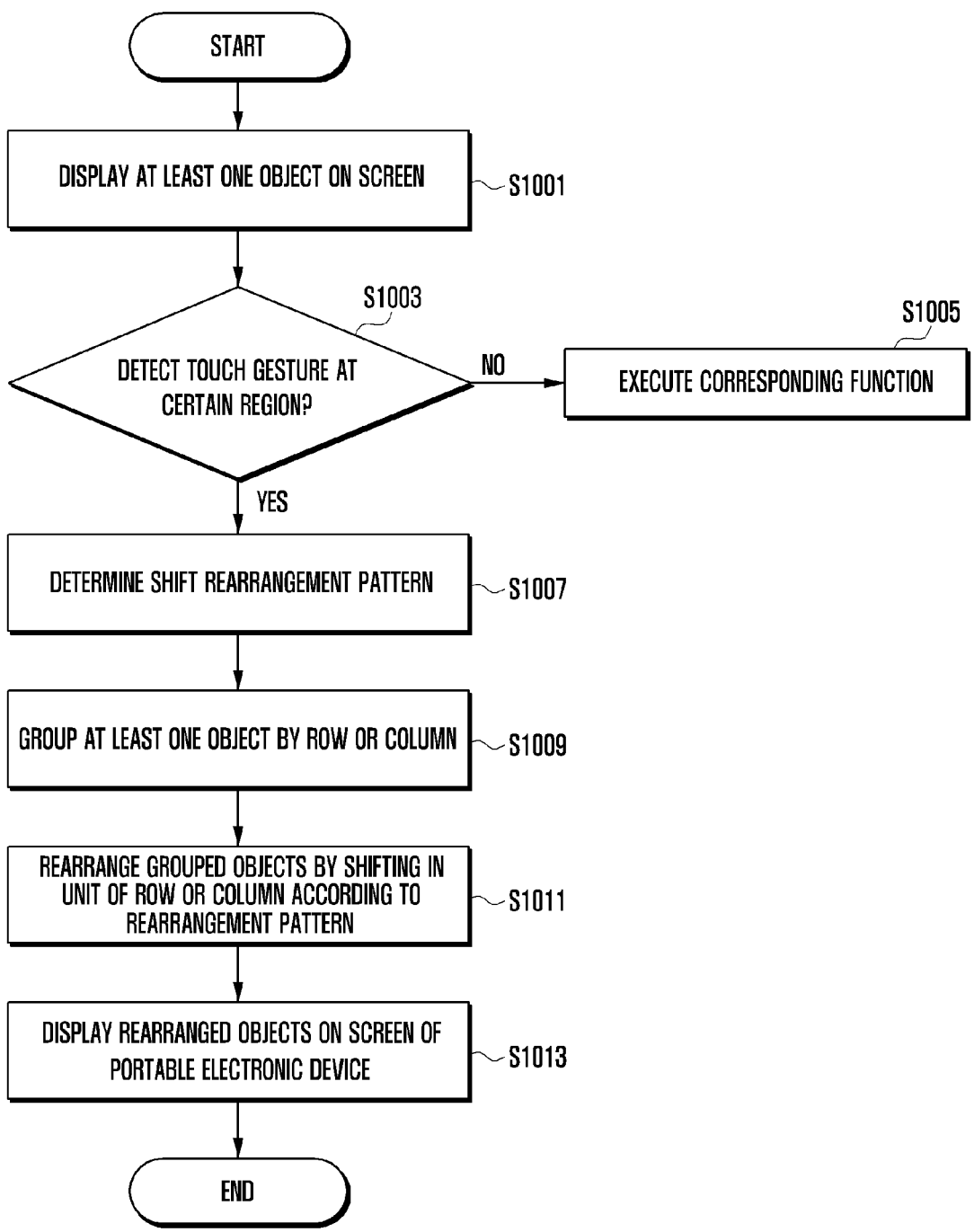
FIG. 10 is a flowchart illustrating an object shift procedure according to an embodiment of the present disclosure.

FIG. 10 is a flowchart illustrating an object shift procedure according to an embodiment of the present disclosure.

Figure 11A:
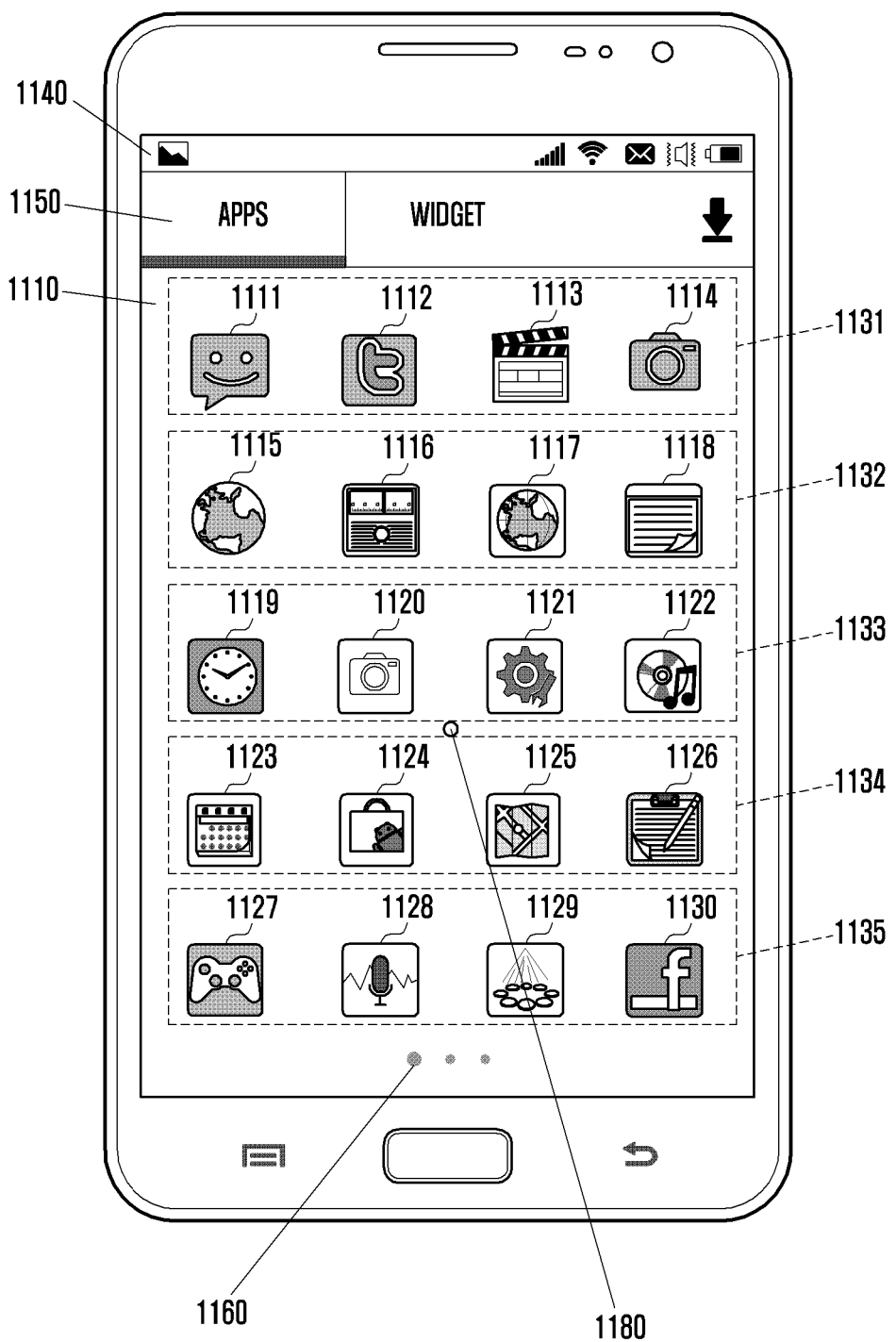
FIGS. 11A, 11B, 11C, and 11D are diagrams illustrating screen displays for explaining object shift on a screen according to an embodiment of the present disclosure.
Figure 11B:
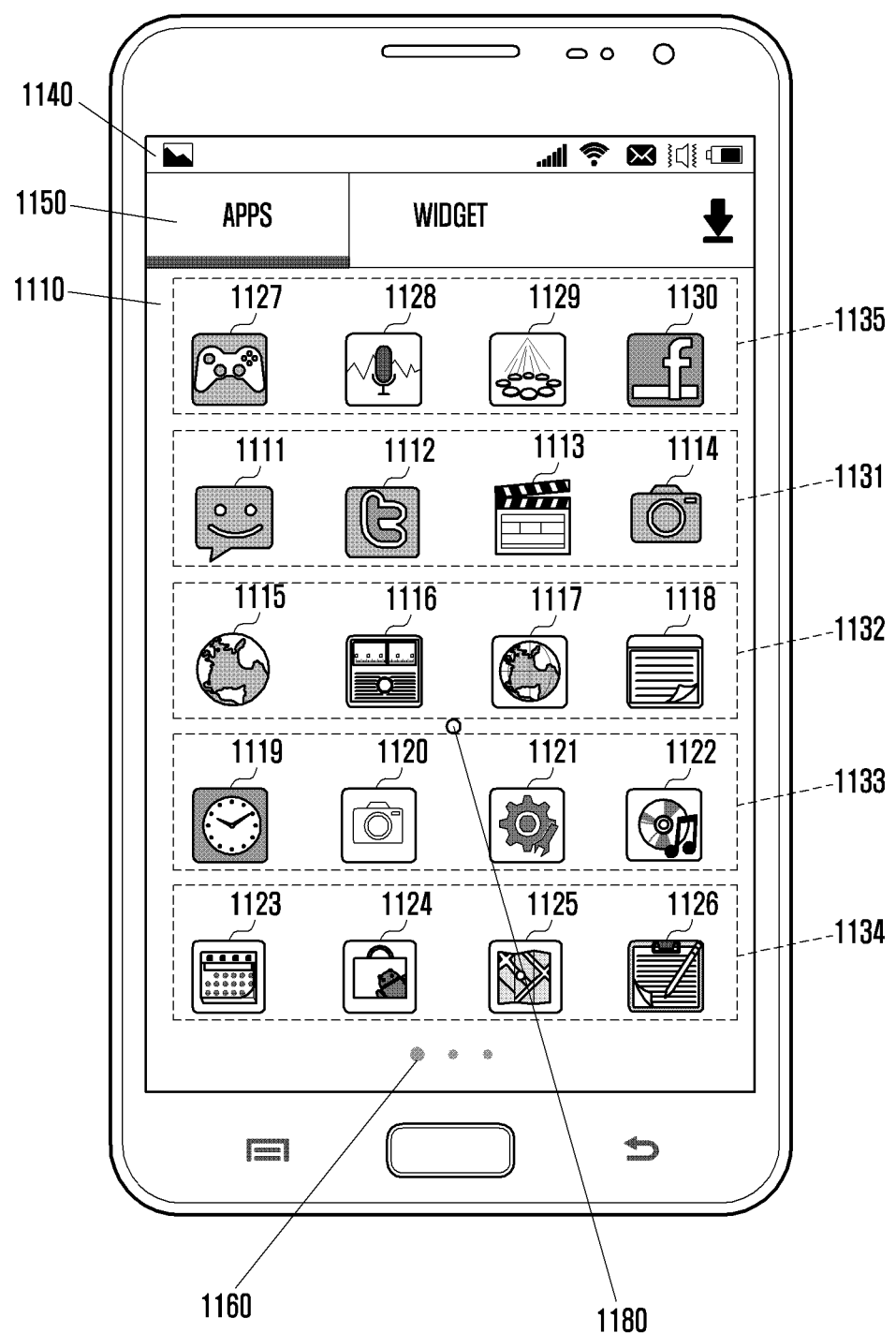
Figure 11C:
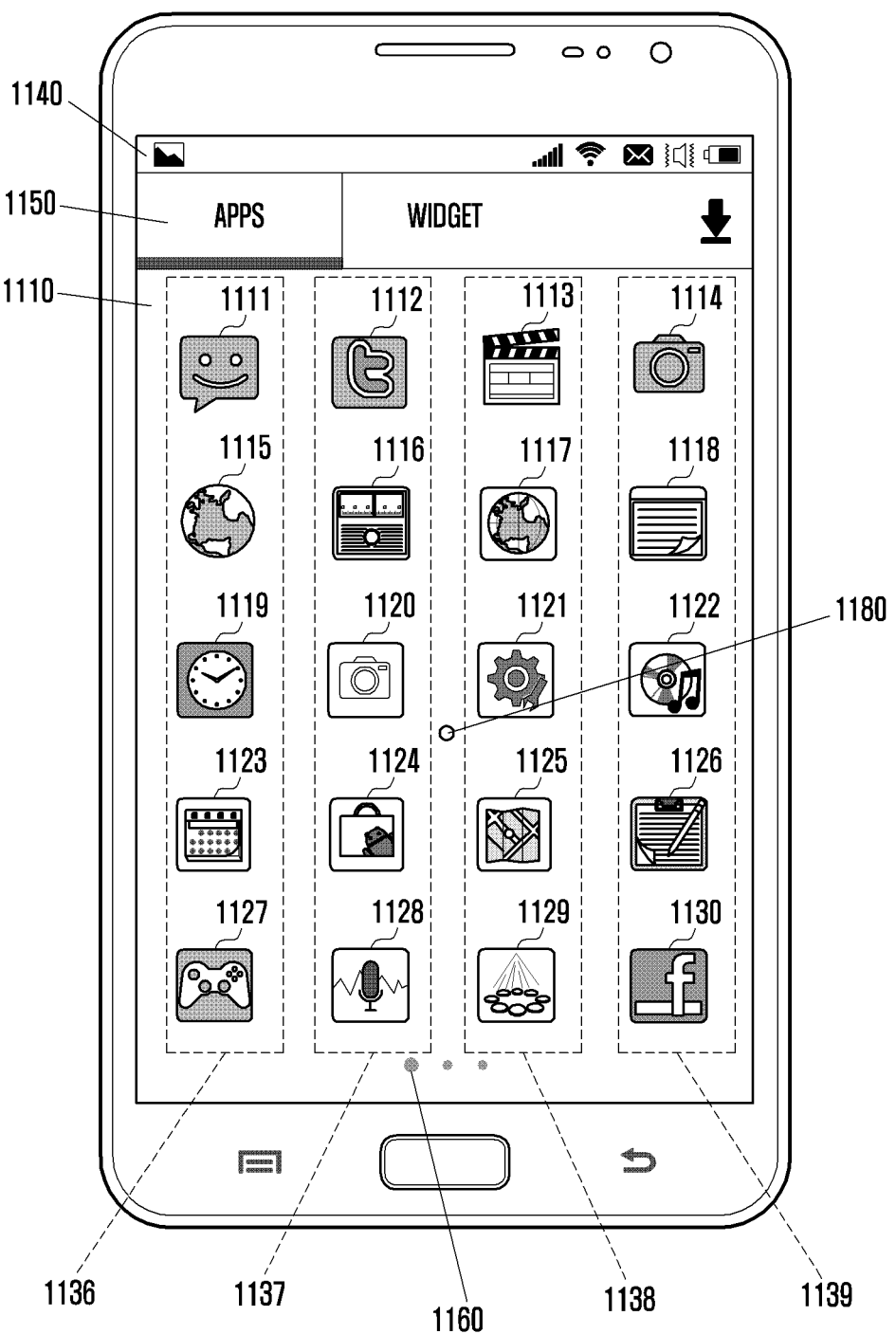
Figure 11D:
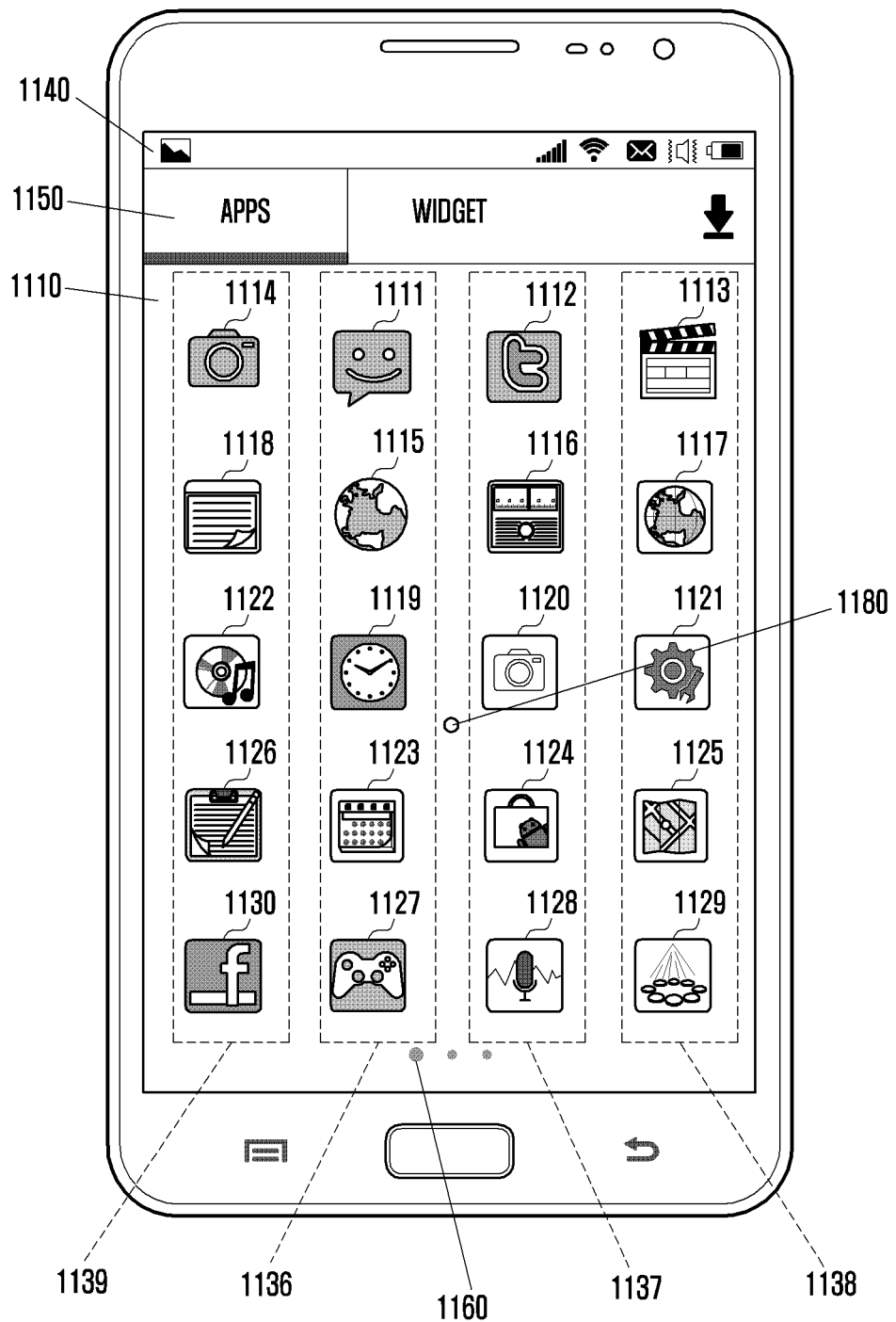

FIGS. 11A to 11D are diagram illustrating screen displays for explaining object shift on the screen according to an embodiment of the present disclosure. For example, FIGS. 11A and 11B show the screen displays for explaining the operation of shifting the objects in units of rows, and FIGS. 11C and 11D show the screen displays for explaining the operation of shifting the objects in units of columns. The description is made with reference to FIGS. 10 and 11A to 11D hereinafter. Since operations S1001, S1003, and S1005 are substantially identical with operations S301, S303, and S305 of FIG. 3, descriptions thereof are omitted herein.

Referring to FIG. 10, the control unit 160 may determine that the object rearrangement pattern is the shift rearrangement pattern based on the touch gesture input at the certain region 1180 at operation S1007. For example, the control unit 160 may receive the touch event from the touch panel 120, determine the change of the touch gesture, and search the rearrangement table 150 for the shift rearrangement pattern corresponding to the change of the touch gesture. Table 3 shows a shift rearrangement table 150 stored in the storage unit 140. The rearrangement Table 3 expresses the movement range of the touch gesture with angles based on the rectangular coordinate system of the 2-dimensional plane. The 2-dimensional plane may be divided into four 90° sections around the origin point of the rectangular coordinate system. The control unit 160 may set the rearrangement pattern to correspond to the change of the touch gesture. In the case of FIG. 11A, if the user inputs a touch gesture at the certain region 1180 and drags the touch in the 0° direction, the control unit 160 may determine the object rearrangement pattern for shifting the objects in units of columns to the right direction.

TABLE 3

| Touch gesture movement range (Unit: °(degree)) | Object rearrangement pattern |
| --- | --- |
| −45°~45° | Right column shift |
| 45°~135° | Up row shift |
| 135°~225° | Left column shift |
| 225°~315° | Down row shift |

The control unit 160 may group the at least one object displayed on the screen in units of rows or columns at operation S1009. In an exemplary case of FIG. 11A, if it is determined that the object rearrangement pattern is the up or down shift object rearrangement pattern, the control unit 160 may group the objects into regions 1131 to 1135 on background screen 1110. In FIG. 11A, the first region 1131 includes the objects 1111 to 1114, the second region 1132 includes the objects 1115 to 1118, the third region 1133 includes the objects 1119 to 1122, the fourth region 1134 includes the objects 1123 to 1126, and the fifth region 1135 includes the objects 1127 to 1130.

The control unit 160 may rearrange the objects in units of rows or columns according to the determined rearrangement pattern at operation S1011. In the case of FIGS. 11A and 11B, if the rearrangement pattern is the down row shift rearrangement pattern, the objects of the first region 1131 may be shifted to the second region 1132, the objects of the second region 1132 to the third region 1133, the objects of the third region 1133 to the fourth region 1134, the objects of the fourth region 1134 to the fifth region 1135. Further, the objects of the fifth region 1135 may be shifted to the first region 1131. As also shown in FIG. 11B, an indication bar 1140, a widget 1150, and a page indicator 1160 may remain in position on the main menu screen of the portable electronic device 100. Alternatively, the positions of the indication bar 1140, the widget 1150, and the page indicator 1160 may be changed in a manner corresponding to the shift rearrangement pattern.

As shown in FIGS. 11C and 11D, if the rearrangement pattern is right column shift rearrangement pattern, the objects of the sixth region 1136 may be shifted to the seventh region 1137, the objects of the seventh region 1137 to the eighth region 1138, the objects of the eighth region 1138 to the ninth region 1139 by one column in the right direction. Similar to the row shift, the objects of the ninth region 1139 may be shifted to the sixth region 1136 at the most left column. Then, the control unit 160 may control the touch screen 110 to display the rearranged objects on the screen of the portable electronic device 100 at operation S1013. As also shown in FIG. 11D, the indication bar 1140, the widget 1150, and the page indicator 1160 may remain in position on the main menu screen of the portable electronic device 100. Alternatively, the positions of the indication bar 1140, the widget 1150, and the page indicator 1160 may be changed in a manner corresponding to the shift rearrangement pattern.

FIGS. 12A to 12D are diagrams illustrating screen displays for explaining object rearrangement on a screen of a portable electronic device according to an embodiment of the present disclosure.

Figure 12A:
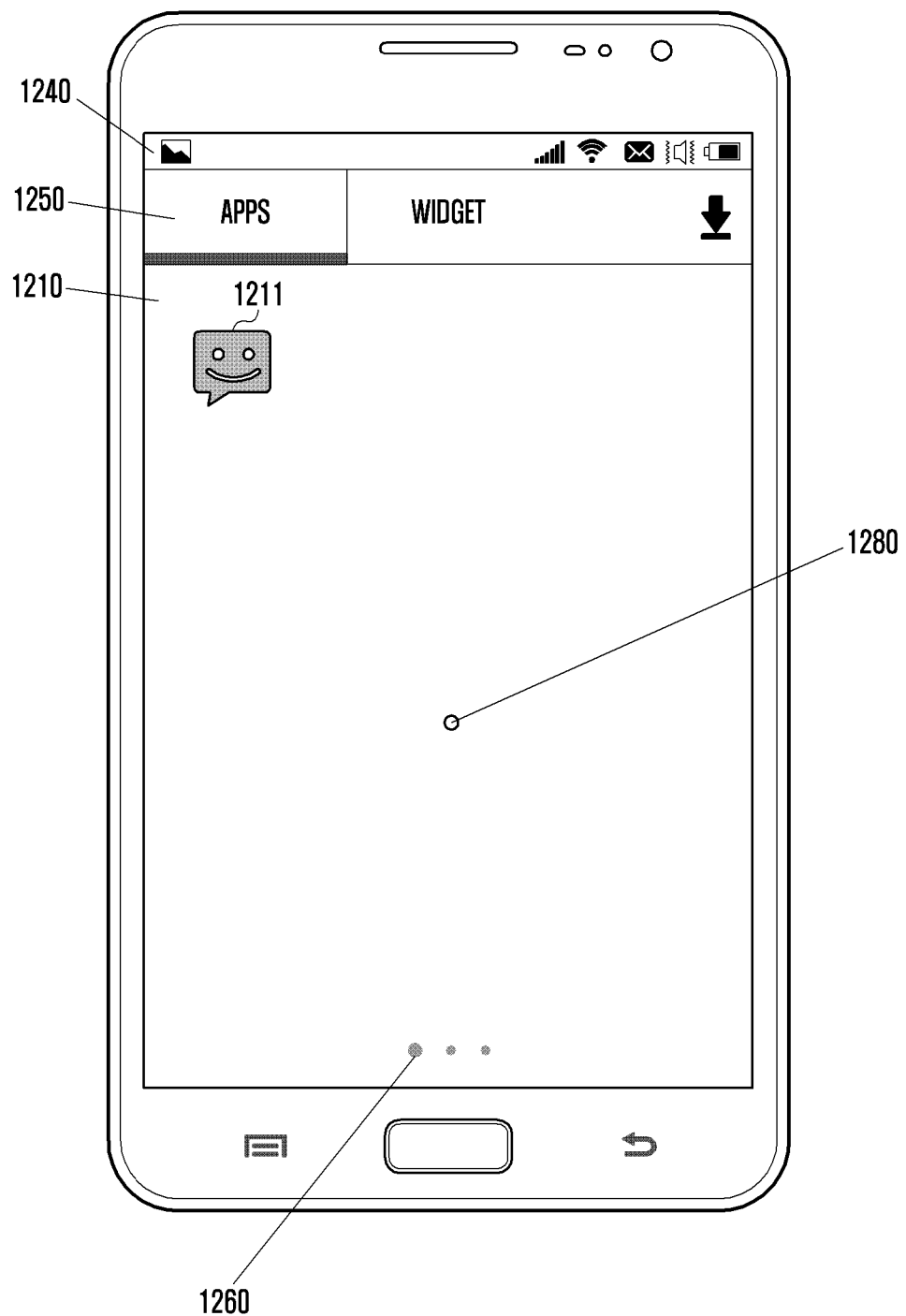
FIGS. 12A, 12B, 12C, and 12D are diagrams illustrating screen displays for explaining object rearrangement on a screen of a portable electronic device according to an embodiment of the present disclosure.

FIG. 12A shows a background screen 1210 displaying one object 1211. According to an embodiment of the present disclosure, the control unit 160 may control to perform the object rearrangement according to a rearrangement pattern even when only one object 1211 is displayed on the screen.

Figure 12B:
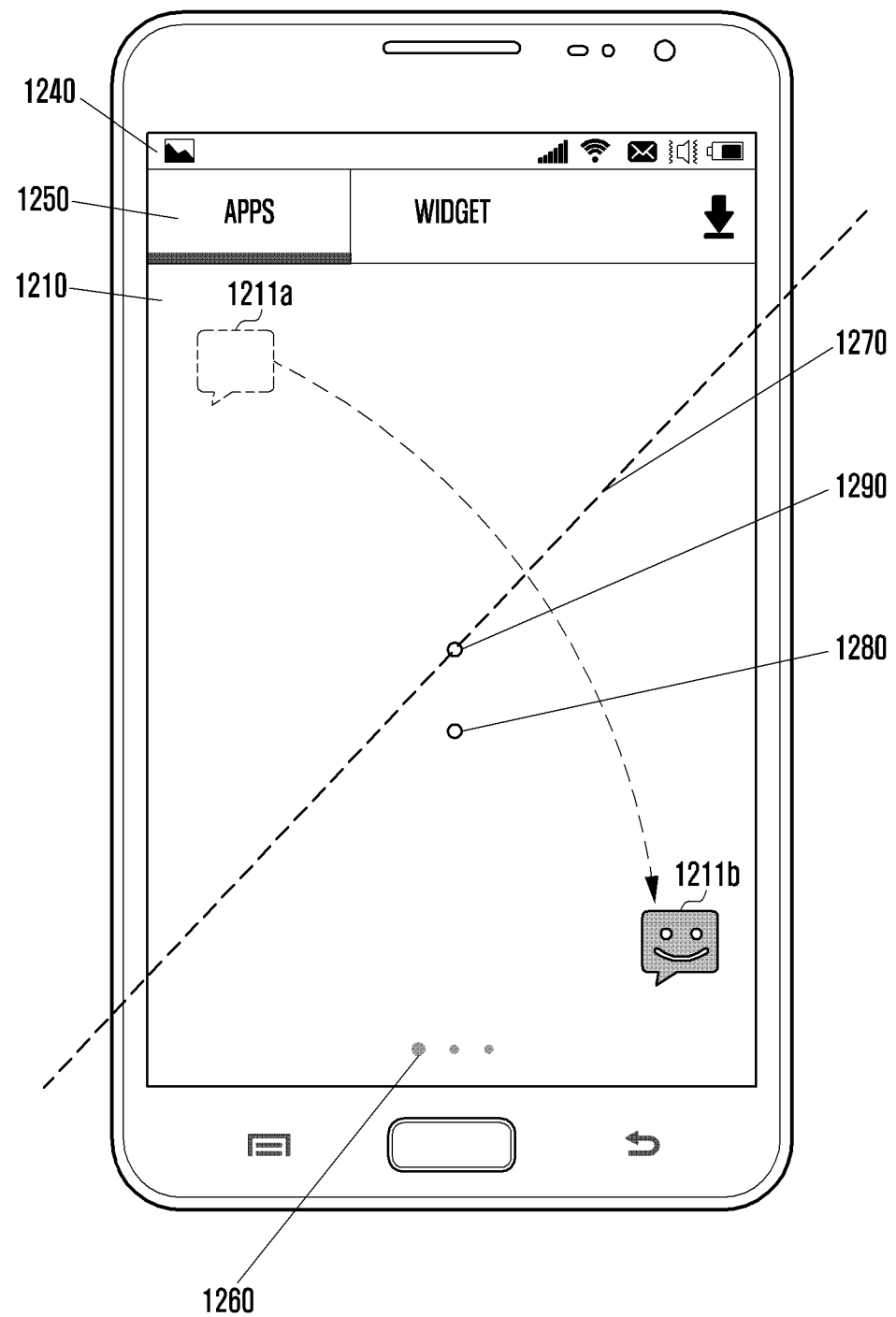
Figure 12C:
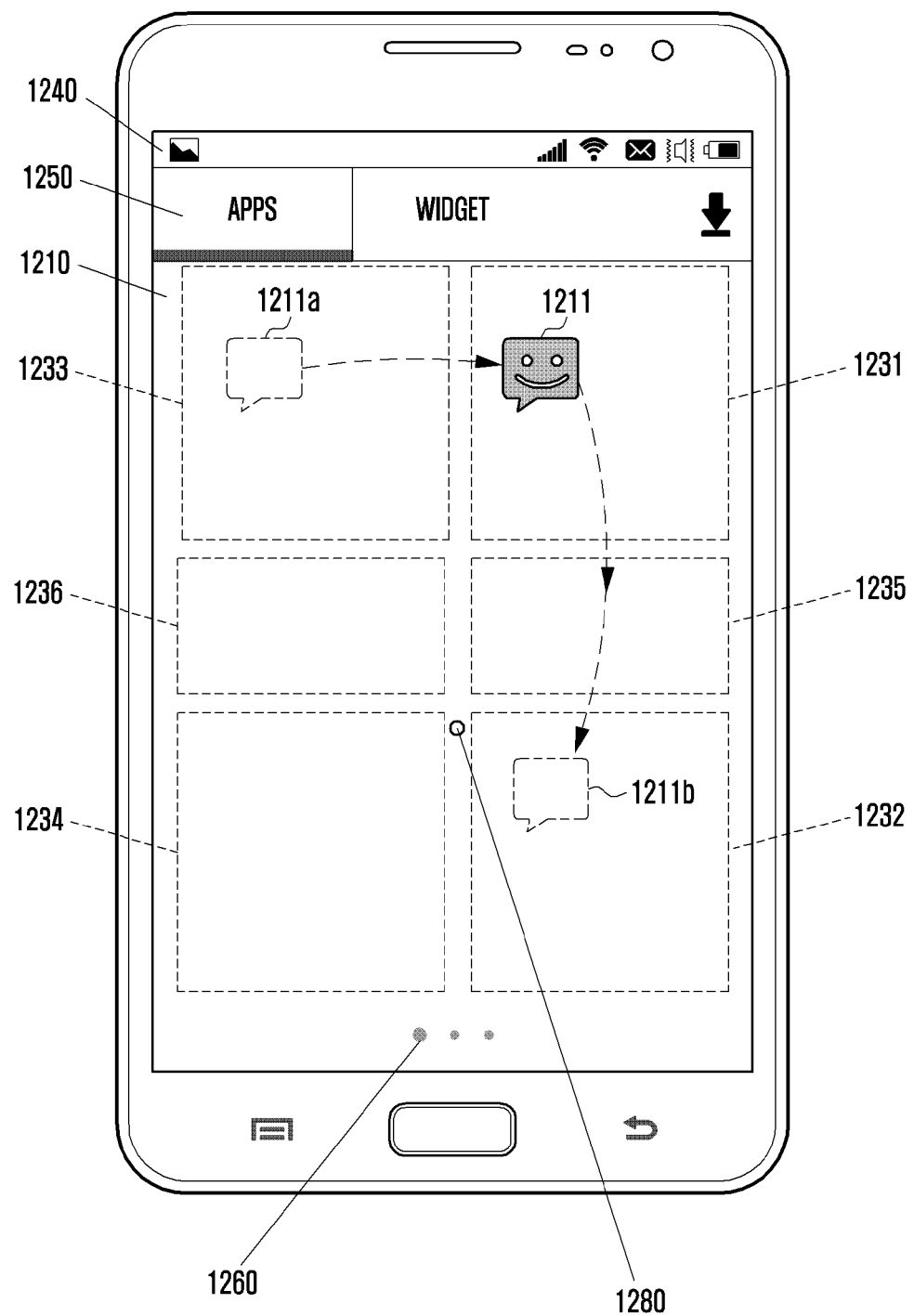
Figure 12D:
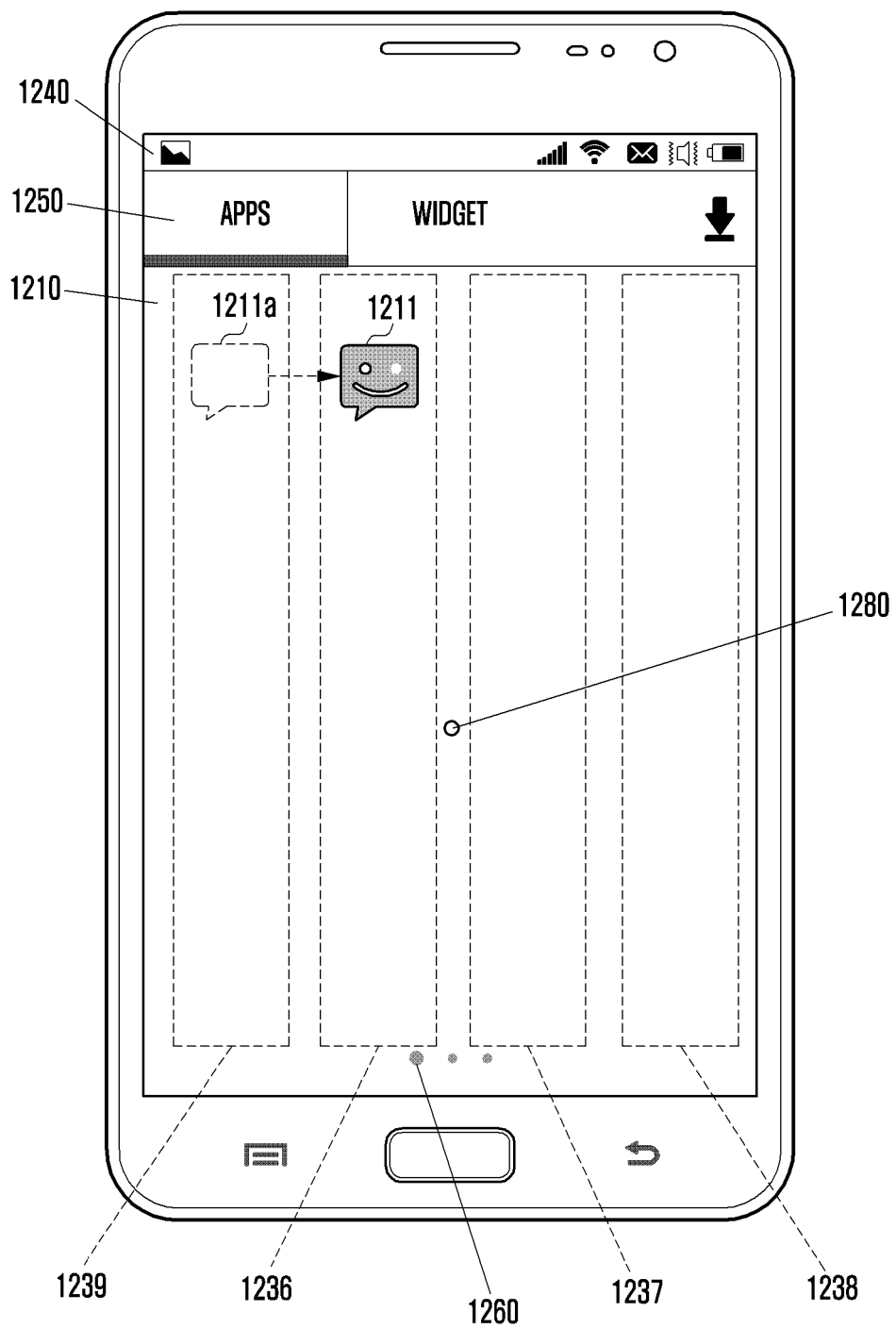

If a touch gesture is detected at the certain region 1280 in the state of FIG. 12A, the control unit 160 may control to rearrange the object 1211 through one of the symmetrical movement, rotational movement, and shift as shown in FIGS. 12B to 12D respectively.

If a touch gestured is detected in the state of FIG. 12B, the control unit 160 may determine the object rearrangement pattern corresponding to the touch gesture. If it is determined that the object rearrangement pattern is the symmetrical rearrangement pattern around a second diagonal line 1270 running from the top right to the bottom left of the background screen 1210 as shown in FIG. 12B, the object 1211 is moved from the original position as denoted by reference number 1211a to another position as denoted by reference number 1211b symmetrically around the center point 1290 as shown in FIG. 12B. At this time, the center point 1290 may not be displayed on the screen. As also shown in FIG. 12B, an indication bar 1240, a widget 1250, and a page indicator 1260 may remain in position on the main menu screen of the portable electronic device 100. Alternatively, the positions of the indication bar 1240, the widget 1250, and the page indicator 1260 may be changed in a manner corresponding to the rearrangement pattern.

FIG. 12C shows how the object is rearranged through the rotational movement. Referring to FIG. 12C, the control unit 160 determines the rotational movement pattern as the clockwise rotational movement pattern. On the basis of the determined rearrangement pattern, the control unit 160 may sort the object into a group matching one of the regions 1231 to 1236. Afterward, the control unit 160 controls such that the group of the object is rotated in the clockwise direction according to the determined pattern and placed at a new position. At this time, the control unit 160 may control such that the groups having no object which match the regions 1232 to 1236 are rotated in the clockwise direction too. As illustrated in FIG. 12C, reference number 1211a denotes the object at the original position in the region 1233 before the rotational movement, and reference number 1211b denotes the object at the position after the rotational movement in the region 1232. As described with reference to FIGS. 8 and 9A to 9D, the group of object 1211 which matches the region 1231 may rotate in the counterclockwise direction.

FIG. 12D shows an object shift by column. For example, the control unit 160 determines the object rearrangement pattern as right column shift rearrangement pattern. In this case, the control unit 160 may sort at least one object into groups matching the respective columns based on the right column shift rearrangement pattern. Afterward, the control unit 160 may shift the group including the object 1211a to the left by column. Next, the control unit 160 may control the object 1211 shifted to the region 1236. At this time, the control unit 160 may control such that the groups having no object which correspond to the columns 1237 to 1239 are shifted to the right by column. If the object rearrangement pattern is determined as the left column shift rearrangement pattern, the control unit 160 controls such that the group including the object 1211 is shifted to the left by column and thus the object 1211 is presented in the region 1236. Although FIG. 12D is directed to the case where the object 1211 is shifted in units of columns, the object may be shifted in units of rows as described with reference to FIGS. 11A and 11B.

As described above, the object display method and apparatus of a portable electronic device according to the present disclosure is capable of allowing for the user to select an object displayed on the screen efficiently in the state of holding and manipulating the device by one hand, resulting in improvement of user convenience and device usability.

It will be understood that the various embodiments of the present disclosure can be implemented in hardware, software, or a combination thereof. The software may be stored in a volatile or a non-volatile memory device, such as, a ROM, irrespective of whether data is erasable or rewritable, in a memory, such as, a RAM, a memory chip, a device, an integrated circuit, a storage medium to which data can be recorded optically or magnetically and from which data can be read by a machine (e.g., a computer), such as a Compact Disc (CD), a Digital Versatile Disc (DVD), a magnetic disk, a magnetic tape, or the like. Furthermore, the embodiments of the present disclosure can be implemented in a computer or a portable terminal that has a controller and a memory, such as a machine-readable storage medium suitable for storing a program or programs including commands, to implement the embodiments of the present disclosure. Accordingly, the present disclosure includes a program having a code for implementing the apparatus or methods defined by the claims and a storage medium readable by a machine that stores the program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An object display method of a portable electronic device, the method comprising:
    displaying a plurality of objects;
    receiving a touch event input from a first region;
    determining a rearrangement of at least one of the plurality of objects based on the touch event;
    grouping the plurality of objects into a first group and a second group based on the rearrangement determination, the first group corresponding to a second region; and
    rearranging at least one of the plurality of objects of the first group according to the rearrangement determination.

2. The method of claim 1,
    wherein the determining of the rearrangement comprises determining a rearrangement pattern associated with the first group based on the touch event, and
    wherein the rearranging of the at least one of the plurality of objects of the first group comprises rearranging the at least one of the plurality of objects of the first group based on the rearrangement pattern associated with the first group.

3. The method of claim 2,
    wherein the determining of the rearrangement pattern comprises determining a pattern of symmetrical movement based on a line, and
    wherein the rearranging of the at least one of the plurality of objects of the first group comprises rearranging the at least one of the plurality of objects of the first group according to the pattern of symmetrical movement.

4. The method of claim 3, wherein the pattern of symmetrical movement comprises a pattern of moving the at least one of the plurality of objects of the first group symmetrically based on a diagonal line.

5. The method of claim 3, wherein the pattern of symmetrical movement comprises a pattern of moving the at least one of the plurality of objects of the first group symmetrically based on a vertical line.

6. The method of claim 3, wherein the pattern of symmetrical movement comprises a pattern of moving the at least one of the plurality of objects of the first group symmetrically based on a horizontal line.

7. The method of claim 2,
    wherein the determining of the rearrangement comprises determining a pattern of rotational movement, and
    wherein the rearranging of the at least one of the plurality of objects of the first group comprises rearranging the at last one of the plurality of objects of the first group according to the pattern of rotational movement.

8. The method of claim 7, wherein the pattern of rotational movement comprises a pattern of rotating the at least one of the plurality of objects in the first group in a clockwise or a counterclockwise direction.

9. The method of claim 2,
    wherein the determining of the rearrangement pattern comprises determining the pattern of shifting the at least one of the plurality of objects of the first group, and
    wherein the rearranging of the at least one of the plurality of objects of the first group comprises rearranging the at least one of the plurality of objects of the first group according to the pattern of shifting the object in units of one of rows and columns.

10. The method of claim 9, further comprising shifting the at least one of the plurality of objects of the first group in one of a last row and a last column to one of a first row and a first column according to the pattern of shifting the object.

11. The method of claim 1, wherein the determining of the rearrangement comprises determining rearrangement of at least one of an indication bar, widgets, and a page indicator.

12. A non-transitory computer-readable recording medium having recorded thereon a program, which, when executed by a computer, implements the method of claim 1.

13. An object display apparatus of a portable electronic device, the apparatus comprising:
    a touch screen configured to generate a touch event input from a first region and to display a plurality of objects; and
    a control unit configured to:
        determine a rearrangement of at least one of the plurality of objects based on the touch event,
        group the plurality of objects into a first group and a second group based on the rearrangement determination, and
        rearrange at least one of the plurality of objects of the first group according to the rearrangement determination.

14. The apparatus of claim 13, wherein the control unit is further configured to:
    determine a rearrangement pattern associated with the first group based on the touch event, and
    rearrange at least one of the plurality of objects of the first group according to the rearrangement pattern associated with the first group.

15. The apparatus of claim 14, wherein the control unit is further configured to:
    determine a pattern of symmetrical movement based on a line, and
    rearrange the at least one of the plurality of objects of the first group according to the pattern of symmetrical movement.

16. The apparatus of claim 15, wherein the pattern of symmetrical movement comprises a pattern of moving the at least one of the plurality of objects of the first group symmetrically based on a diagonal line.

17. The apparatus of claim 15, wherein the pattern of symmetrical movement comprises a pattern of moving the at least one of the plurality of objects of the first group symmetrically based on a vertical line.

18. The apparatus of claim 15, wherein the pattern of symmetrical movement comprises a pattern of moving the at least one of the plurality of objects of the first group symmetrically based on a horizontal line.

19. The apparatus of claim 15, wherein the control unit is further configured to:
    determine the pattern of shifting the at least one of the plurality of objects of the first group, and
    rearrange the at least one of the plurality of objects of the first group according to the pattern of shifting the at least one of the plurality of objects of the first group in units of one of rows and columns.

20. The apparatus of claim 19, wherein the control unit is further configured to shift the at least one of the plurality of objects of the first group in one of a last row and a last column to one of a first row and a first column according to the pattern of shifting the at least one of the plurality of objects of the first group.

21. The apparatus of claim 14, wherein the control unit is further configured to:
   determine a pattern of rotational movement, and
   rearrange the at least one of the plurality of objects of the first group according to the pattern of rotational movement.

22. The apparatus of claim 21, wherein the pattern of rotational movement comprises a pattern of rotating the at least one of the plurality of objects in the first group in a clockwise or a counterclockwise direction.

23. The apparatus of claim 13, wherein the control unit is further configured to determine rearrangement of at least one of an indication bar, widgets, and a page indicator.

\* \* \* \* \*